US008858328B2

United States Patent
Kitahara

(10) Patent No.: US 8,858,328 B2
(45) Date of Patent: Oct. 14, 2014

(54) STORAGE MEDIUM HAVING GAME PROGRAM STORED THEREIN, HAND-HELD GAME APPARATUS, GAME SYSTEM, AND GAME METHOD

(75) Inventor: Shinji Kitahara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 488 days.

(21) Appl. No.: 12/868,905

(22) Filed: Aug. 26, 2010

(65) Prior Publication Data

US 2011/0300931 A1   Dec. 8, 2011

(30) Foreign Application Priority Data

Jun. 2, 2010  (JP) .................................. 2010-127092

(51) Int. Cl.
 *A63F 9/24*   (2006.01)
 *A63F 13/20*   (2014.01)
(52) U.S. Cl.
 CPC ........... *A63F 13/06* (2013.01); *A63F 2300/204* (2013.01); *A63F 2300/6045* (2013.01); *A63F 2300/1093* (2013.01); *A63F 2300/308* (2013.01); *A63F 2300/695* (2013.01)
 USPC ................................... 463/33; 463/9; 463/37
(58) Field of Classification Search
 CPC . A63F 13/00; A63F 13/06; A63F 2300/1087; A63F 2300/69; A63F 2009/2435; A63F 2300/105; A63F 2300/405; A63F 2300/6018; G06F 3/017
 USPC ................................. 463/9, 11, 30–33, 36, 37
 See application file for complete search history.

(56) References Cited

U.S. PATENT DOCUMENTS

| 5,643,084 | A | * | 7/1997 | Mirsky | ............................... 463/9 |
| 5,944,605 | A | * | 8/1999 | Pajitnov | ............................ 463/9 |
| 6,422,560 | B1 | * | 7/2002 | Harbaugh | ................. 273/157 R |
| 2002/0183112 | A1 | * | 12/2002 | Emmerson et al. | ............. 463/41 |
| 2005/0219416 | A1 | * | 10/2005 | Gielow | .......................... 348/556 |
| 2007/0057458 | A1 | * | 3/2007 | Haag | ........................ 273/157 R |
| 2007/0126874 | A1 | * | 6/2007 | Kake | .............................. 348/159 |
| 2008/0182635 | A1 | * | 7/2008 | Chiu | ................................ 463/11 |
| 2009/0258687 | A1 | * | 10/2009 | Weichselbaum | .................. 463/9 |
| 2010/0062858 | A1 | * | 3/2010 | Kert et al. | ........................ 463/42 |

FOREIGN PATENT DOCUMENTS

| JP | A-2004-209110 | 7/2004 |
| JP | A-2007-44373 | 2/2007 |
| JP | 2007-185454 | 7/2007 |

* cited by examiner

*Primary Examiner* — Steve Rowland
(74) *Attorney, Agent, or Firm* — Nixon & Vanderhye, P.C.

(57) ABSTRACT

An information processing section of a game apparatus executes a program including: a step of setting a puzzle area to be cut from an image taken by an outer camera; a step of setting the division number representing the number of portions into which the puzzle area is divided in accordance with a stage; a step of generating one-dimensional arrangement data representing a state in which puzzle pieces are positioned at random; a step of executing a game process by updating the one-dimensional arrangement data of the puzzle pieces which are selected based on a tilt of the game apparatus; and a step of switching, in accordance with the one-dimensional arrangement data, texture coordinate data of the puzzle pieces calculated based on a tilt of a virtual camera, and displaying an obtained image.

16 Claims, 22 Drawing Sheets

(THIRD POSITION)

(FIRST POSITION)

FIG. 9

| PIECE POSITION | RETAINED ARRANGEMENT DATA (PIECE NUMBER OF PIECE POSITIONED AT PIECE POSITION INDICATED IN LEFT COLUMN) | TEXTURE COORDINATE DATA | | | |
|---|---|---|---|---|---|
| | | X(1), Y(1) | X(2), Y(2) | X(3), Y(3) | X(4), Y(4) |
| 1 | 7 | | | | |
| 2 | 6 | | | | |
| 3 | 9 | | | | |
| 4 | 5 | | | | |
| 5 | 4 | | | | |
| 6 | 8 | | | | |
| 7 | 3 | | | | |
| 8 | 2 | | | | |
| 9 | 1 | | | | |

| 1 | 2 | 3 |
|---|---|---|
| 4 | 5 | 6 |
| 7 | 8 | 9 |

BEFORE PUZZLE PIECES ARE
POSITIONED AT RANDOM
(WHEN GAME IS ENDED)
1→2→3→4→5→6→7→8→9

(b)

| 7 | 6 | 9 |
|---|---|---|
| 5 | 4 | 8 |
| 3 | 2 | 1 |

WHEN GAME IS STARTED
7→6→9→5→4→8→3→2→1

F I G. 1 5
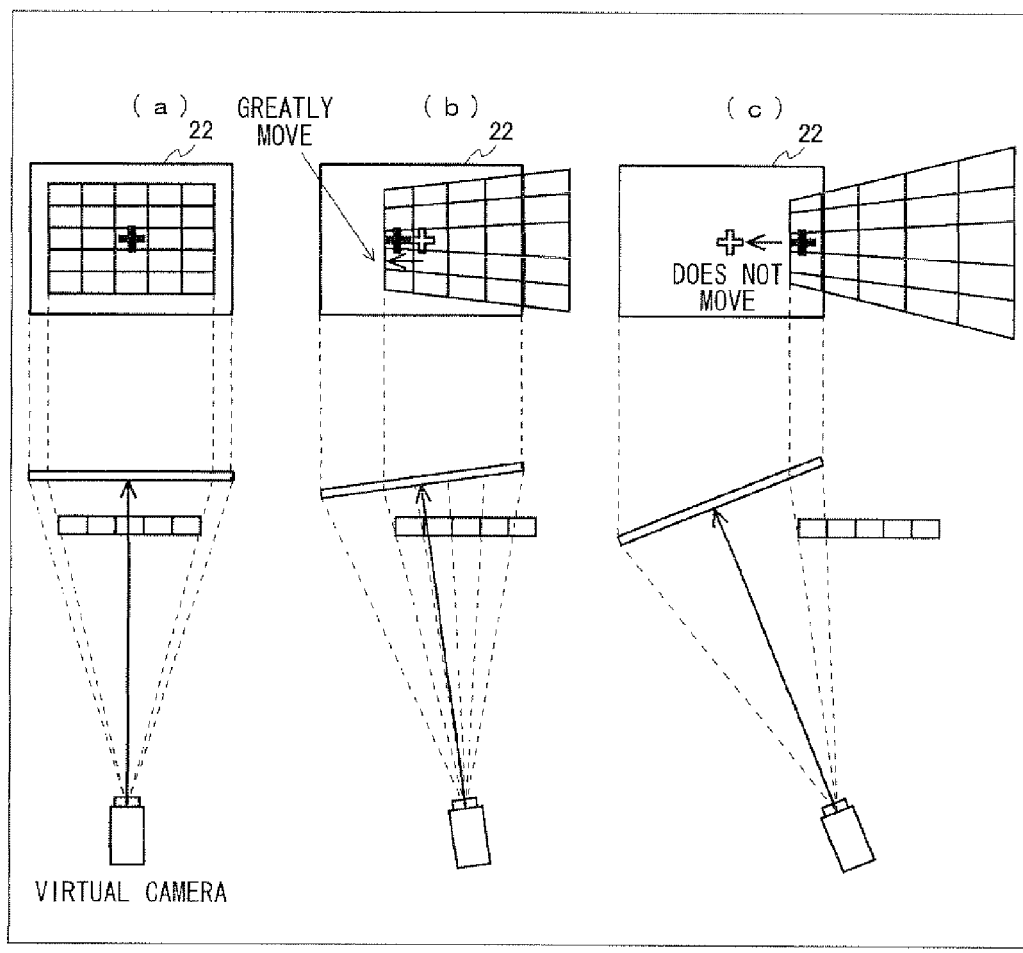

1→2→3→4→5→6→7→8→9

7→6→9→5→4→8→3→2→1

7→6→9→5→4→8→3→2→1

7→6→9→5→4→8→3→2→1

7→6→9→5→4→8→3→2→1

7→6→9→5→4→8→3→2→1

7→6→9→4→5→8→3→2→1

1→8→3→4→5→6→7→2→9

1→8→3→4→5→6→7→2→9

F I G. 1 8 C
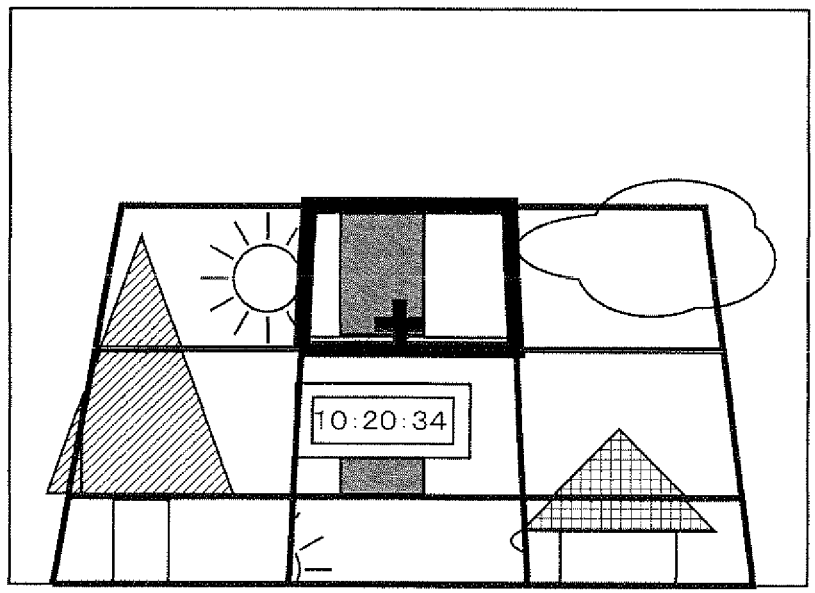
1→8→3→4→5→6→7→2→9
F I G. 1 8 D
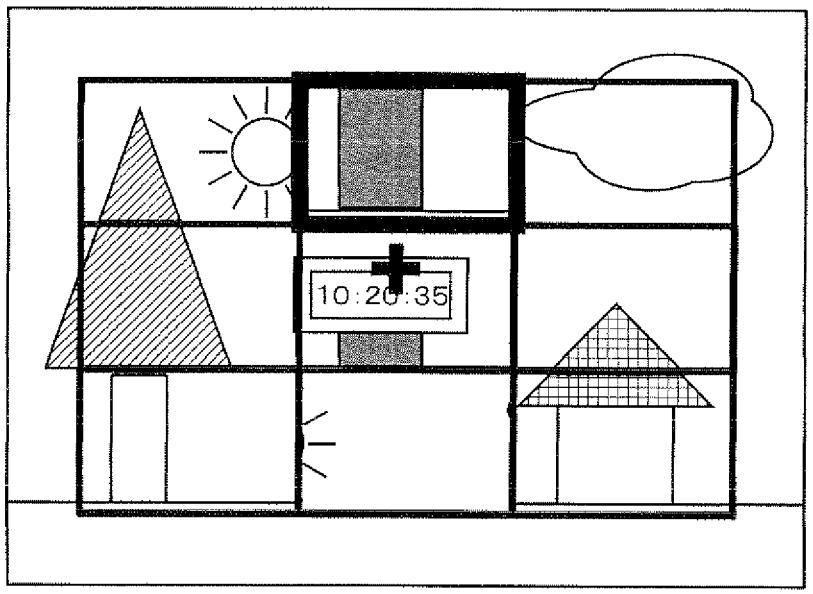
1→8→3→4→5→6→7→2→9

1→8→3→4→5→6→7→2→9

1→8→3→4→5→6→7→2→9

1→2→3→4→5→6→7→8→9

1→2→3→4→5→6→7→8→9

STORAGE MEDIUM HAVING GAME PROGRAM STORED THEREIN, HAND-HELD GAME APPARATUS, GAME SYSTEM, AND GAME METHOD

CROSS REFERENCE TO RELATED APPLICATION

The disclosure of Japanese Patent Application No. 2010-127092, filed on Jun. 2, 2010, is incorporated herein by reference.

BACKGROUND AND SUMMARY

1. Technical Field

The technology presented herein relates to a game using a photographed image, and more particularly to a game in which a predetermined area of a photographed image is divided into small areas (puzzle pieces), the small areas obtained by the division are positioned at random, and the small areas positioned at random are switched and returned to an original state in accordance with a user's operation.

2. Background

A so-called puzzle game in which a still image is divided into a plurality of puzzle pieces, and the plurality of puzzle pieces are positioned at random, and the plurality of puzzle pieces positioned at random are returned to proper positions, respectively, by a user referring to an image, is executed by a dedicated game apparatus or a general-purpose computer. For example, Japanese Laid-Open Patent Publication No. 2007-185454 (hereinafter, referred to as Patent Literature 1) discloses that data of a previously photographed moving image is used in such a puzzle game. The puzzle game apparatus disclosed in Patent Literature 1 displays images of the same time axis, on puzzle pieces, respectively, and allows a user to return the puzzle pieces to proper positions, respectively, by referring to the moving image.

However, the image used in the puzzle game by the puzzle game apparatus disclosed in Patent Literature 1 is a moving image, which is a previously photographed moving image. Therefore, the moving image needs to be previously photographed and stored, and further variation of the moving image displayed on the puzzle pieces is small, thereby reducing user's interest. Further, a user uses a cross-shaped cursor button or an arrow button (in the case of a game apparatus), or a mouse (in the case of a computer) to select a puzzle piece to be switched and returned to a proper position, in such a puzzle game. The user is familiar with such an operation. Therefore, the operability is enhanced while the user's interest is reduced. Thus, the puzzle game apparatus disclosed in Patent Literature 1 cannot provide a puzzle game which enables enhancement of user's interest.

SUMMARY

Therefore, a feature of the present embodiments is to provide a game technique in which an image photographed by a user is used to enhance the user's interest in a displayed image.

Another feature of the present embodiments is to provide a game technique for enhancing user's interest in selection operation.

The present embodiments have the following features to solve the aforementioned problems.

A first aspect is directed to a computer-readable storage medium having a game program stored therein. The game program stored in the storage medium causes a computer of a hand-held game apparatus including an imaging device and a display device to function as acquisition means, image division means, positioning means, retaining means, image update means, display control means, change means, determination means, and game process means. The acquisition means sequentially acquires taken-image data representing a taken-image which is taken by the imaging device. The image division means divides, into a plurality of small areas, an image of a predetermined area in the taken-image represented by the taken-image data acquired by the acquisition means. The positioning means positions, in the predetermined area, the plurality of small areas into which the image of the predetermined area is divided by the image division means, so as to form an image different from the taken-image which is taken by the imaging device. The retaining means retains a positioning state in which the plurality of small areas are positioned, by using, as an initial value, a positioning state obtained by the positioning means. The image update means sequentially updates, by using the taken-image data having been sequentially acquired, images to be displayed on the plurality of small areas, respectively, of which the positioning state is retained by the retaining means. The display control means causes the display device to display the images updated by the image update means. The change means changes the positioning state of the plurality of small areas, which is retained by the retaining means, in accordance with an operation performed by a user viewing the images displayed by the display device. The determination means determines whether or not the positioning state of the plurality of small areas, which is changed by the change means, satisfies a predetermined condition. The game process means performs a predetermined game process in accordance with a result of a determination made by the determination means.

In this configuration, the taken-image data is sequentially acquired, and the sequentially taken images are used to sequentially update images to be displayed on the plurality of small areas. The positioning state of the plurality of small areas is retained by the retaining means, and an initial value of the positioning state represents a state in which positions of the plurality of small areas are positioned at random so as to represent an image which is different from the taken image, thereby realizing a puzzle game using the plurality of small areas. The positioning state of the plurality of small areas retained by the retaining means is changed in accordance with an operation performed by a user who views the images thus displayed (the sequentially taken images displayed on the plurality of small areas), and desires to return the displayed images to an original image. The game process is performed such that, for example, the positioning state of the plurality of small areas retained by the retaining means is returned to a state (a state in which the plurality of small areas represent the image taken by the imaging device) in which the plurality of small areas have not been positioned at random by the positioning means (game successfully resolves), or the positioning state is returned halfway to the state in which the plurality of small areas have not been positioned at random (game fails due to time out), or the game is ended. Thus, a puzzle game can be realized by using an image which is being currently taken by a user with a hand-held game apparatus. In this case, the displayed image is sequentially updated, thereby enhancing a user's interest.

Preferably, a game executed by the game program is a puzzle game, and the game process means may perform a process for causing the puzzle game to successfully resolve when the positioning state in which a plurality of puzzle pieces corresponding to the plurality of small areas are positioned is returned to a state in which the plurality of puzzle pieces have not been positioned by the positioning means. In this case, the retaining means may retain the positioning state of the plurality of puzzle pieces by retaining arrangement data representing the positioning state of the plurality of puzzle pieces, which is changed in accordance with the operation performed by a user, until the puzzle game successfully resolves. In this case, the arrangement data may be one-dimensional arrangement data.

In this configuration, it is possible to realize a puzzle game in which an image which is sequentially taken is displayed on the puzzle pieces corresponding to the plurality of small areas, respectively. Arrangement data based on the positioning state of the puzzle pieces which is changed by a user performing an operation for switching the puzzle pieces, is retained. The operation for switching the puzzle pieces is continued until a state in which the plurality of puzzle pieces have not been positioned at random (a state in which the puzzle pieces are properly positioned as in the state where the image has been taken, that is, a state in which the game has successfully resolved) is obtained, thereby progressing the puzzle game. In this case, since the arrangement data is retained as the one-dimensional arrangement data, even when the number of puzzle pieces is increased, the positioning state in which a plurality of the puzzle pieces are positioned can be retained in a reduced amount of data.

Preferably, the program may cause the computer to further function as detection means for detecting for a change in an imaging direction of the imaging device, and area change means for changing a display state in which the predetermined area is displayed, based on the change in the imaging direction detected by the detection means.

In this configuration, when a user tilts a hand-held game apparatus including the imaging device, the change in the imaging direction of the imaging device is detected. The change of the imaging direction causes the change of the display state in which the predetermined area is displayed, thereby changing an image displayed on the puzzle pieces, for example. Therefore, a user's interest can be enhanced. A method for detecting the change in the imaging direction is not limited to any specific method. It is possible to use, for example, a method based on the taken-image data, a method in which a sensor for detecting an acceleration is used, and a method in which a sensor (gyro sensor) for detecting an angular acceleration (and an angular rate) is used.

Preferably, the program may cause the computer to further function as predetermined area setting means for setting the predetermined area such that the predetermined area is returned to a state in which the display state has not been changed by the area change means, in accordance with an operation performed by a user.

In this configuration, when a user is enjoying the puzzle game while tilting the hand-held game apparatus so as to change the image displayed on the puzzle pieces, if the user tilts the hand-held game apparatus too greatly, difficulty in the operation and/or the puzzle game may occur rather than the user's interest being enhanced. In this case, when a user performs a reset operation or the like, the user can make a fresh start from a state in which a predetermined area is set, and the puzzle is in an original state (a state in which the display state has not been changed, and the puzzle pieces are positioned at proper positions), to allow a user to replay the puzzle game. Therefore, a user who is unfamiliar with the operation or a user who is not skilled in the operation can easily enjoy the puzzle game, as well as the user's interest is enhanced.

Preferably, the area change means may change the display state in which the predetermined area is displayed such that the predetermined area is moved in a direction opposite to a direction in which the imaging direction is changed. Further, the area change means may change the display state in which the predetermined area is displayed such that the predetermined area is enlarged in a direction opposite to a direction in which the imaging direction is changed.

In this configuration, when, for example, a user orients, in the leftward direction, a hand-held game apparatus (a game apparatus which enables the imaging direction to be changed in accordance with the game apparatus being tilted) which has the imaging device on the reverse surface of a housing in which rectangular display device is mounted, the imaging direction is oriented leftward. In this case, a distance between the game apparatus and an object which exists on the right side of the field of view of the imaging device is relatively reduced as compared to a distance between the game apparatus and an object which exists on the left side of the field of view of the imaging device In accordance with the tilting of the game apparatus as described above, the image is displayed by the display device such that the image is moved in a direction opposite to a direction toward which the imaging direction is oriented, or the image is enlarged in a direction opposite to a direction toward which the imaging direction is oriented, thereby enhancing a user's interest.

Preferably, the image update means may update the images to be displayed on the plurality of small areas by pasting, as textures, images of the plurality of small areas in the taken-image represented by the taken-image data having been most recently acquired by the acquisition means, to a plurality of polygons, in a virtual three-dimensional space, corresponding to the plurality of small areas, respectively, and by taking an image of the plurality of polygons by using a virtual camera. In this case, the area change means may change a range of the predetermined area of the taken-image by changing at least one of a position and an orientation of the virtual camera based on the change in the imaging direction detected by the detection means.

In this configuration, in the three-dimensional virtual space, the puzzle pieces are divided based on contours of polygons, and images having been most recently taken are pasted on the polygons, respectively, as textures, and rendered by using a virtual camera. In this case, at least one of a relative position and a relative orientation of the virtual camera is changed based on the change of the imaging direction. Therefore, the display state in which the predetermined area corresponding to the entirety of the puzzle is displayed is changed in accordance with the game apparatus being tilted. Therefore, it is possible to realize a game apparatus which enables enhancement of a user's interest, by using a virtual camera.

Preferably, the program may cause the computer to further function as selection means for selecting one of the plurality of small areas displayed by the display device in accordance with the change in the imaging direction detected by the detection means.

In this configuration, the imaging direction is changed by a user tilting the hand-held game apparatus. For example, when the puzzle piece positioned in the imaging direction is to be selected as a piece to be switched, the piece to be switched can be selected by the game apparatus being tilted. When the game apparatus is tiled to select the piece to be switched as described above, the display state in which the predetermined area is displayed is changed. Therefore, in a state where the display state in which the predetermined area is displayed is changed, a user is allowed to select the piece to be switched from among the plurality of the puzzle pieces. It is possible to realize a game apparatus which enables enhancement of the user's interest by performing such an operation.

Preferably, the selection means may select one of the plurality of small areas under a condition in which those of the plurality of small areas which are displayed near an end portion of the display device are more likely to be selected as compared to those of the plurality of small areas which are displayed near a center portion of the display device.

In this configuration, when the puzzle piece to be switched is selected by the game apparatus being tilted, ones of the plurality of small areas which are displayed at the end portion of the display device can be easily selected. Therefore, it is unnecessary to greatly tilt the game apparatus for selecting ones of the puzzle pieces displayed at the end portion, so that the selection of the puzzle piece can be facilitated, thereby improving the operability.

Preferably, the program may cause the computer to further function as combined-image generation means for combining the image, outside the predetermined area, which is sequentially acquired by the acquisition means, with the images, in the predetermined area, which are updated by the image update means, to generate a combined image. In this case, the image division means may divide, into the plurality of small areas, the image in the predetermined area which is smaller than the taken-image. The display control means may cause the display device to display the combined image which is obtained through combination performed by the combined-image generation means.

In this configuration, the taken image includes an image in the predetermined area (puzzle area) and an image outside the predetermined area, and the image outside the predetermined area can be used as a hint to the puzzle game, so that even an unskilled user is able to end the puzzle game.

Preferably, the program may cause the computer to further function as number-of-plurality-of-small-areas setting means for setting a number of the plurality of small areas in accordance with a skill of a user.

In this configuration, the number of puzzle pieces may be increased for a skilled user, and the number of puzzle pieces may be reduced for an unskilled user. Therefore, a user can enjoy the game in accordance with her/his skill.

A second aspect is directed to a game apparatus which includes: imaging means for taking an image; display means for displaying the taken-image; acquisition means for sequentially acquiring taken-image data representing the taken-image which is taken by the imaging means; image division means for dividing, into a plurality of small areas, an image of a predetermined area in the taken-image represented by the taken-image data acquired by the acquisition means; positioning means for positioning, in the predetermined area, the plurality of small areas into which the image of the predetermined area is divided by the image division means, so as to form an image different from the taken-image which is taken by the imaging means; retaining means for retaining a positioning state in which the plurality of small areas are positioned, by using, as an initial value, a positioning state obtained by the positioning means; image update means for sequentially updating, by using the taken-image data having been sequentially acquired, images to be displayed on the plurality of small areas, respectively, of which the positioning state is retained by the retaining means; display control means for causing the display means to display the images updated by the image update means; change means for changing the positioning state of the plurality of small areas, which is retained by the retaining means, in accordance with an operation performed by a user viewing the images displayed by the display means; determination means for determining whether or not the positioning state of the plurality of small areas, which is changed by the change means, satisfies a predetermined condition; and game process means for performing a predetermined game process in accordance with a result of a determination made by the determination means.

A third aspect is directed to a game system which includes: imaging means for taking an image; display means for displaying the taken-image; acquisition means for sequentially acquiring taken-image data representing the taken-image which is taken by the imaging means; image division means for dividing, into a plurality of small areas, an image of a predetermined area in the taken-image represented by the taken-image data acquired by the acquisition means; positioning means for positioning, in the predetermined area, the plurality of small areas into which the image of the predetermined area is divided by the image division means, so as to form an image different from the taken-image which is taken by the imaging means; retaining means for retaining a positioning state in which the plurality of small areas are positioned, by using, as an initial value, a positioning state obtained by the positioning means; image update means for sequentially updating, by using the taken-image data having been sequentially acquired, images to be displayed on the plurality of small areas, respectively, of which the positioning state is retained by the retaining means; display control means for causing the display means to display images updated by the image update means; change means for changing the positioning state of the plurality of small areas, which is retained by the retaining means, in accordance with an operation performed by a user viewing the images displayed by the display means; determination means for determining whether or not the positioning state of the plurality of small areas, which is changed by the change means, satisfies a predetermined condition; and game process means for performing a predetermined game process in accordance with a result of a determination made by the determination means.

A fourth aspect is directed to a game method which includes: an imaging step of taking an image; a display step of displaying the taken-image; an acquisition step of sequentially acquiring taken-image data representing the taken-image which is taken by the imaging step; an image division step of dividing, into a plurality of small areas, an image of a predetermined area in the taken-image represented by the taken-image data acquired by the acquisition step; a positioning step of positioning, in the predetermined area, the plurality of small areas into which the image of the predetermined area is divided by the image division step, so as to form an image different from the taken-image which is taken by the imaging step; a retaining step of retaining a positioning state in which the plurality of small areas are positioned, by using, as an initial value, a positioning state obtained by the positioning step; an image update step of sequentially updating, by using the taken-image data having been sequentially acquired, images to be displayed on the plurality of small areas, respectively, of which the positioning state is retained by the retaining step; a display control step of controlling the display step to display the images updated by the image update step; a change step of changing the positioning state of the plurality of small areas, which is retained by the retaining step, in accordance with an operation performed by a user viewing the images displayed by the display step; a determination step of determining whether or not the positioning state of the plurality of small areas, which is changed by the change step, satisfies a predetermined condition; and a game process step of performing a predetermined game process in accordance with a result of a determination made by the determination step.

The game apparatus according to the second aspect, the game system according to the third aspect, and the game method according to the fourth aspect exert the same operation and effect as those of the game program according to the first aspect.

According to the present embodiments, a user can freely set a moving image for a puzzle, and the puzzle is displayed as if the puzzle represents an actual world, thereby enhancing the user's interest. When a puzzle piece is selected by the game apparatus being tilted, thereby increasing the enhancement of the user's interest.

These and other features, aspects and advantages of the present embodiments will become more apparent from the following detailed description of the present embodiments when taken in conjunction with the accompanying drawings.

BRIEF DESCRIPTION OF THE DRAWINGS

FIG. 9 is a diagram illustrating a structure of a piece positioning storage table shown in FIG. 8;

FIG. 10 is a diagram illustrating piece arrangement data;

FIG. 15 is a conceptual diagram (part 1) illustrating a state in which a puzzle piece is selected when the game apparatus is tilted;

FIG. 18C is a diagram illustrating an exemplary image which is displayed on the upper LCD 22 when the second small area is confirmed to be selected in a state shown in FIG. 18B;

FIG. 18D is a diagram illustrating an exemplary image which is displayed on the upper LCD 22 when the game apparatus is returned from the tilted position;

DESCRIPTION OF THE PREFERRED EMBODIMENTS (Structure of Game Apparatus)

Figure 1:
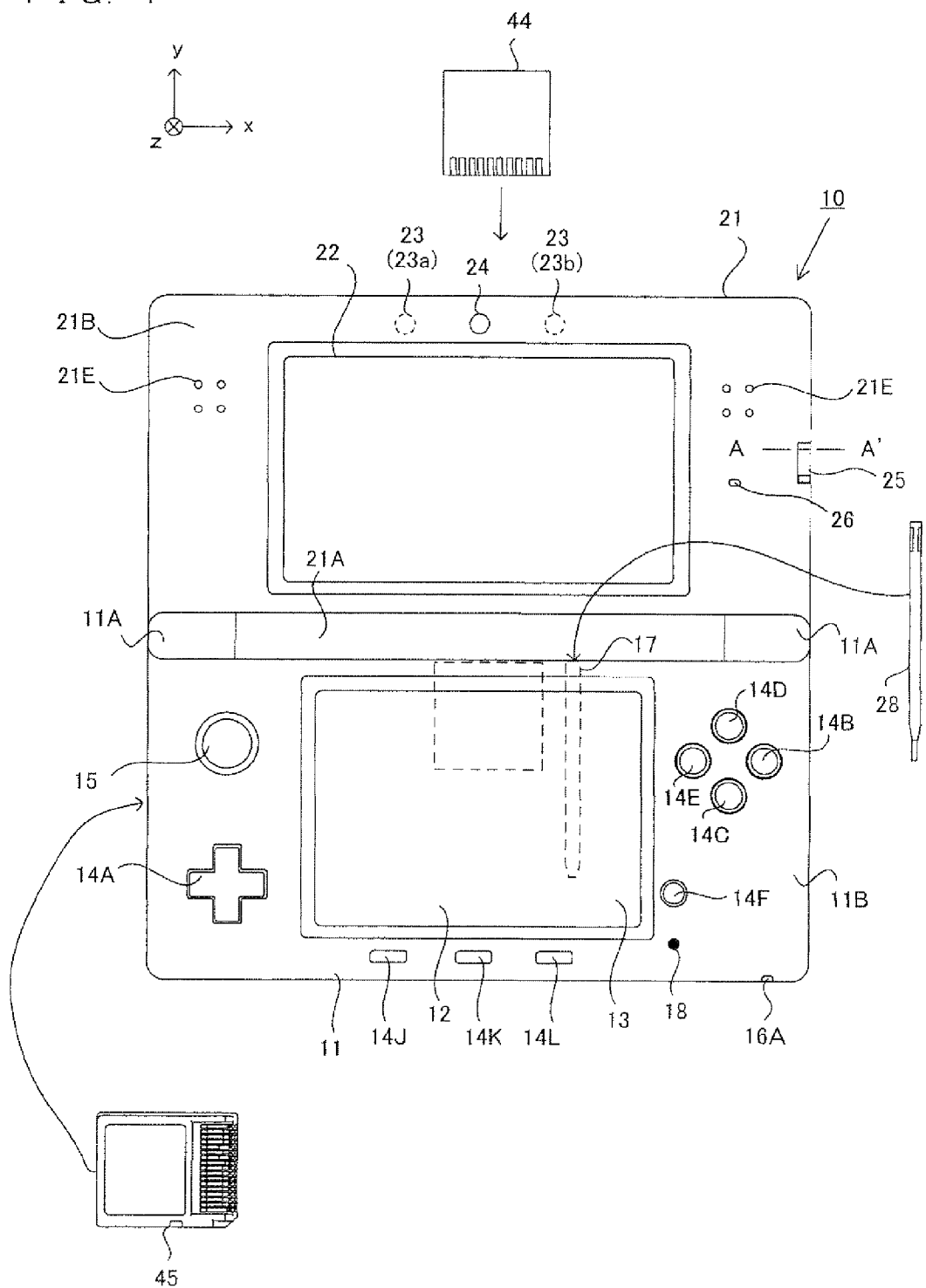
FIG. 1 is a front view of a game apparatus 10 in an opened state.
Figure 2:
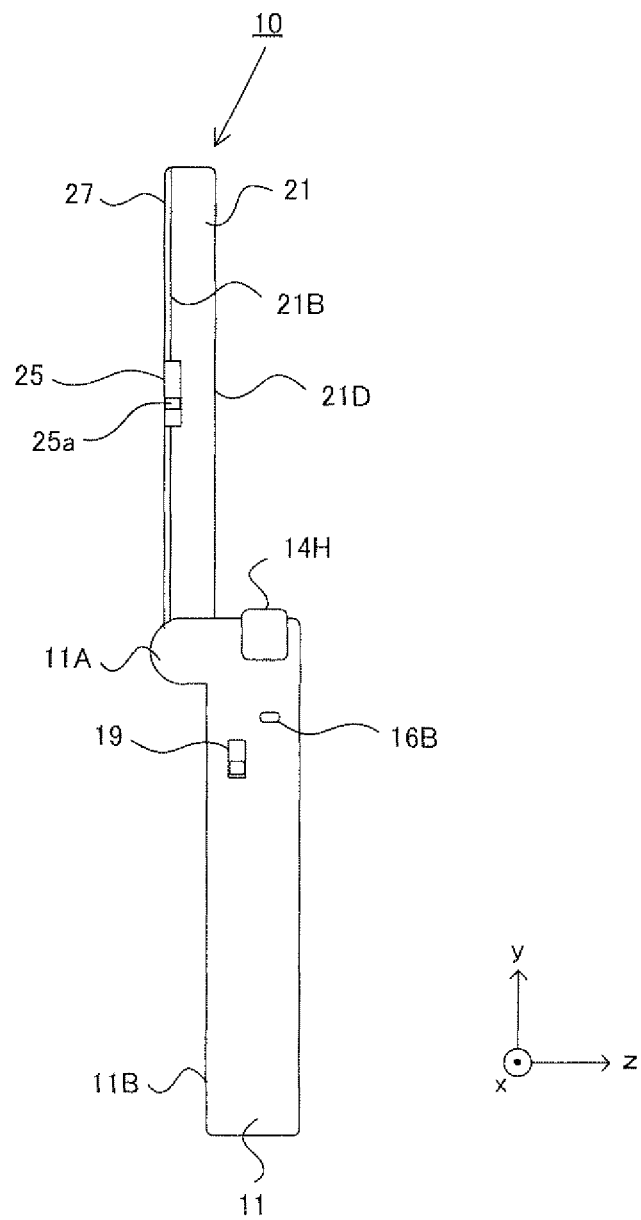
FIG. 2 is a side view of the game apparatus 10 in the opened state.
Figure 3:
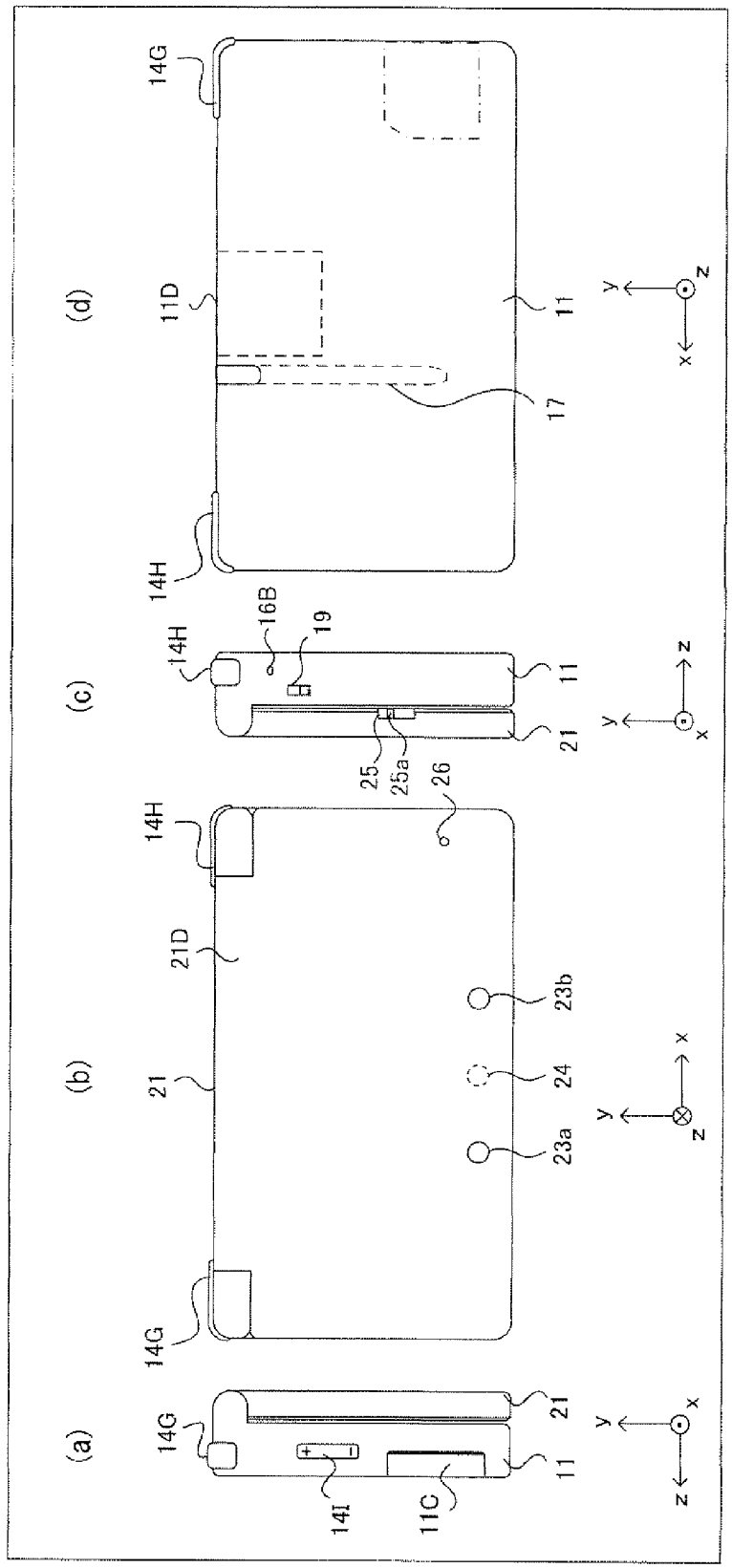
FIG. 3 is a left side view, a front view, a right side view, and a rear view of the game apparatus 10 in a closed state.

Hereinafter, a game apparatus according to one embodiment will be described. FIG. 1 to FIG. 3 are each a plan view of an outer appearance of a game apparatus 10. The game apparatus 10 is a hand-held game apparatus, and is configured to be foldable as shown in FIG. 1 to FIG. 3. FIG. 1 and FIG. 2 show the game apparatus 10 in an opened state, and FIG. 3 shows the game apparatus 10 in a closed state. FIG. 1 is a front view of the game apparatus 10 in the opened state, and FIG. 2 is a right side view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 to FIG. 3. The game apparatus 10 includes a lower housing 11 and an upper housing 21 as shown in FIG. 1 to FIG. 3. The lower housing 11 and the upper housing 21 are connected to each other so as to be openable and closable (foldable). In the present embodiment, the lower housing 11 and the upper housing 21 are each formed in a horizontally long plate-like rectangular shape, and are connected to each other at long side portions thereof so as to be pivotable with respect to each other.

As shown in FIG. 1 and FIG. 2, projections 11A each of which projects in a direction orthogonal to an inner side surface (main surface) 11B of the lower housing 11 are provided at the upper long side portion of the lower housing 11, whereas a projection 21A which projects from the lower side surface of the upper housing 21 in a direction orthogonal to the lower side surface of the upper housing 21 is provided at the lower long side portion of the upper housing 21. Since the projections 11A of the lower housing 11 and the projection 21A of the upper housing 21 are connected to each other, the lower housing 11 and the upper housing 21 are foldably connected to each other.

(Description of Lower Housing)

Initially, a structure of the lower housing 11 will be described. As shown in FIG. 1 to FIG. 3, in the lower housing 11, a lower LCD (Liquid Crystal Display) 12, a touch panel 13, operation buttons 14A to 14L (FIG. 1, FIG. 3), an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening of the lower housing 11. When the game apparatus 10 is not used, the game apparatus 10 is in the closed state, thereby preventing the screen of the lower LCD 12 from becoming unclean and damaged. The number of pixels of the lower LCD 12 may be, for example, 256 dots×192 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 3(d)) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. As shown in FIG. 1, the cross button 14A is provided to the left of the lower LCD 12 in the lower portion of the lower housing 11. That is, the analog stick 15 is provided above the cross button 14A. The analog stick 15 and the cross button 14A are positioned so as to be operated by a thumb of a left hand with which the lower housing is held. Further, the analog stick 15 is provided in the upper area, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Four buttons, that is, the button 14B, the button 14C, the button 14D, and the button 14E, which are positioned so as to form a cross shape, are positioned such that a thumb of a right hand with which the lower housing 11 is held is naturally positioned on the positions of the four buttons. Further, the four buttons and the analog stick 15 sandwich the lower LCD 12, so as to be bilaterally symmetrical in position with respect to each other. Thus, depending on a game program, for example, a left-handed person can make a direction instruction input by using these four buttons.

Further, the microphone hole 18 is provided on the inner side surface of the lower housing 11. Under the microphone hole 18, a microphone (see FIG. 7) is provided as a sound input device described below, and the microphone detects for a sound from the outside of the game apparatus 10.

FIG. 3(a) is a left side view of the game apparatus 10 in the closed state. FIG. 3(b) is a front view of the game apparatus 10 in the closed state. FIG. 3(c) is a right side view of the game apparatus 10 in the closed state. FIG. 3(d) is a rear view of the game apparatus 10 in the closed state. As shown in FIG. 3(b) and FIG. 3(d), an L button 14G and an R button 14H are provided on the upper side surface of the lower housing 11 The L button 14G is positioned on the left end portion of the upper side surface of the lower housing 11 and the R button 14H is positioned on the right end portion of the upper side surface of the lower housing 11. As described below, the L button 14G and the R button 14H act as shutter buttons (imaging instruction buttons) of the imaging section. Further, as shown in FIG. 3(a), a sound volume button 14I is provided on the left side surface of the lower housing 11. The sound volume button 14I is used for adjusting a sound volume of a speaker of the game apparatus 10.

As shown in FIG. 3(a), a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10. The connector and the cover section 11C may be provided on the right side surface of the lower housing 11.

Further, as shown in FIG. 3(d), an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10. The connector and the insertion opening 11D may be provided on another side surface (for example, the right side surface) of the lower housing 11.

Further, as shown in FIG. 1 and FIG. 3(c), a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 3(c)).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 3, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

Figure 4:
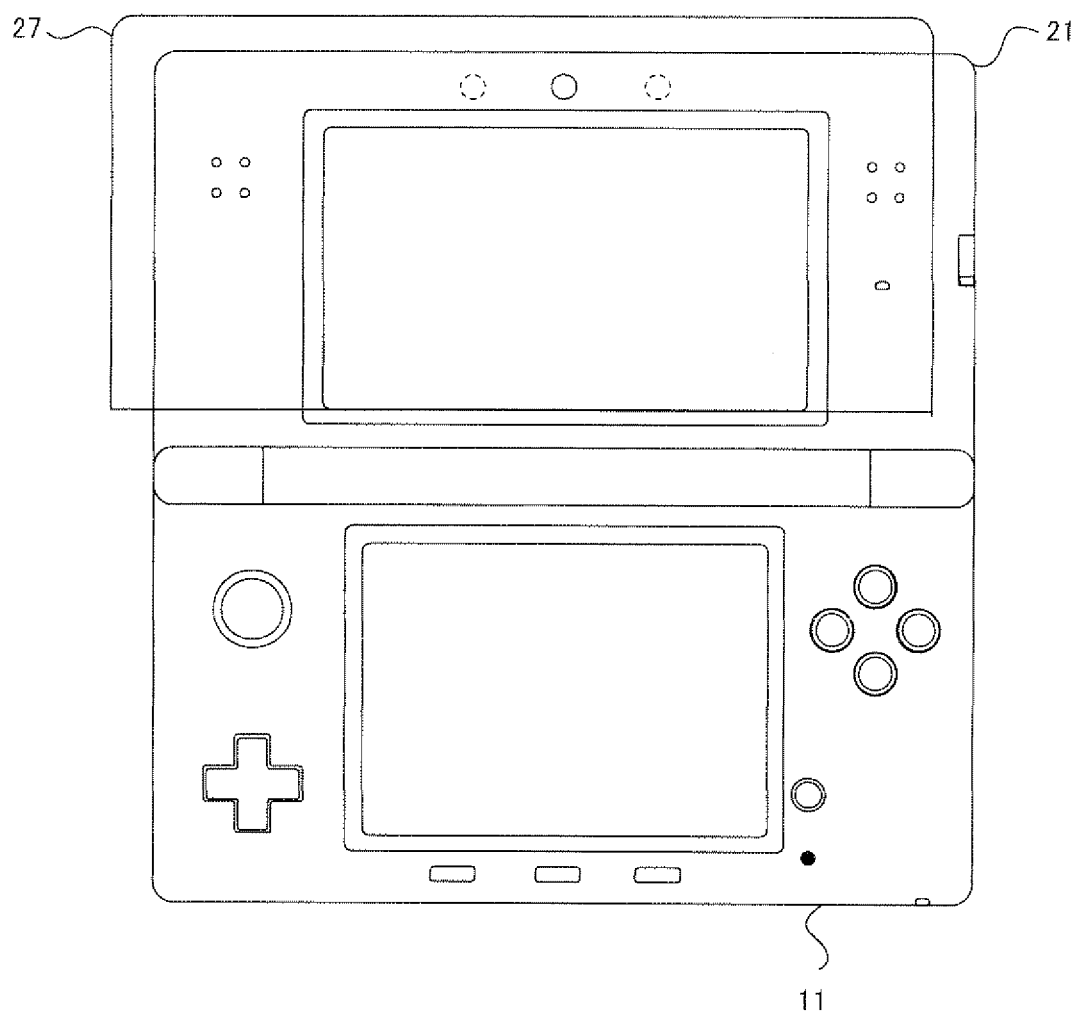
FIG. 4 is a diagram illustrating a state in which a screen cover 27 is removed from an inner side surface of an upper housing 21.

The screen of the upper LCD 22 is provided on the inner side surface (main surface) 21B of the upper housing 21, and the screen of the upper LCD 22 is exposed at an opening of the upper housing 21. Further, as shown in FIG. 2 and FIG. 4, the inner side surface of the upper housing 21 is covered with a transparent screen cover 27. FIG. 4 is an exploded view illustrating a state in which the screen cover 27 is removed from the inner side surface of the upper housing 21. The screen cover 27 protects the screen of the upper LCD 22, and integrates the upper LCD 22 and the inner side surface of the upper housing 21 with each other, thereby achieving unity. The number of pixels of the upper LCD 22 may be, for example, 640 dots×200 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye are alternately displayed for a predetermined time period may be used. Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. Further, these imaging sections are each designed so as to be positioned in a direction which is opposite to the normal direction of the display surface (inner side surface) of the upper LCD 22 by 180 degrees. Specifically, the imaging direction of the outer imaging section (left) 23a and the imaging direction of the outer imaging section (right) 23b are parallel to each other. The outer imaging section (left) 23a and the outer imaging section (right) 23b can be used as a stereo camera depending on a program executed by the game apparatus 10. Further, depending on a program, when any one of the two outer imaging sections (23a and 23b) is used alone, the outer imaging section 23 may be used as a non-stereo camera. Further, depending on a program, images taken by the two outer imaging sections (23a and 23b) may be combined with each other or may compensate for each other, thereby enabling imaging using an extended imaging range. In the present embodiment, the outer imaging section 23 is structured so as to include two imaging sections, that is, the outer imaging section (left) 23a and the outer imaging section (right) 23b. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

As indicated by dashed lines in FIG. 1 and by solid lines in FIG. 3(b), the outer imaging section (left) 23a and the outer imaging section (right) 23b forming the outer imaging section 23 are aligned so as to be parallel to the horizontal direction of the screen of the upper LCD 22. Specifically, the outer imaging section (left) 23a and the outer imaging section (right) 23b are positioned such that a straight line connecting between the two imaging sections is parallel to the horizontal direction of the screen of the upper LCD 22. Reference numerals 23a and 23b which are indicated as dashed lines in FIG. 1 represent the outer imaging section (left) 23a and the outer imaging section (right) 23b, respectively, which are positioned on the outer side surface reverse of the inner side surface of the upper housing 21. As shown in FIG. 1, when a user views the screen of the upper LCD 22 from the front thereof, the outer imaging section (left) 23a is positioned to the left of the upper LCD 22 and the outer imaging section (right) 23b is positioned to the right of the upper LCD 22. When a program for causing the outer imaging section 23 to function as a stereo camera is executed, the outer imaging section (left) 23a takes an image for a left eye, which is viewed by a left eye of a user, and the outer imaging section (right) 23b takes an image for a right eye, which is viewed by a right eye of the user. A distance between the outer imaging section (left) 23a and the outer imaging section (right) 23b is set so as to be approximately the same as a distance between both eyes of a person, that is, may be set so as to be within a range from 30 mm to 70 mm, for example, However, the distance between the outer imaging section (left) 23a and the outer imaging section (right) 23b is not limited to a distance within the range described above.

In the present embodiment, the outer imaging section (left) 23a and the outer imaging section (right) 23b are secured to the housing, and the imaging directions thereof cannot be changed.

Further, the outer imaging section (left) 23a and the outer imaging section (right) 23b are positioned to the left and to the right, respectively, of the upper LCD 22 (on the left side and the right side, respectively, of the upper housing 21) so as to be horizontally symmetrical with respect to the center of the upper LCD 22. Specifically, the outer imaging section (left) 23a and the outer imaging section (right) 23b are positioned so as to be symmetrical with respect to a line which divides the upper LCD 22 into two equal parts, that is, the left part and the right part. Further, the outer imaging section (left) 23a and the outer imaging section (right) 23b are positioned at positions which are reverse of positions above the upper edge of the screen of the upper LCD 22 and which are on the upper portion of the upper housing 21 in an opened state. Specifically, when the upper LCD 22 is projected on the outer side surface of the upper housing 21, the outer imaging section (left) 23a and the outer imaging section (right) 23b are positioned, on the outer side surface of the upper housing 21, at a position above the upper edge of the screen of the upper LCD 22 having been projected.

As described above, the two imaging sections (23a and 23b) of the outer imaging section 23 are positioned to the left and the right of the upper LCD 22 so as to be horizontally symmetrical with respect to the center of the upper LCD 22. Therefore, when a user views the upper LCD 22 from the front thereof, the imaging direction of the outer imaging section 23 can be the same as the direction of the line of sight of the user. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIG. 1 and FIG. 3(b), the inner imaging section 24 is positioned on the inner side surface of the upper housing 21 at a position reverse of the middle position between the left and the right imaging sections (the outer imaging section (left) 23a and the outer imaging section (right) 23b) of the outer imaging section 23. Specifically, when the left and the right imaging sections of the outer imaging section 23 provided on the outer side surface of the upper housing 21 are projected on the inner side surface of the upper housing 21, the inner imaging section 24 is positioned at the middle position between the left and the right imaging sections having been projected. The dashed line 24 indicated in FIG. 3(*b*) represents the inner imaging section 24 positioned on the inner side surface of the upper housing 21.

As described above, the inner imaging section 24 is used for taking an image in the direction opposite to that of the outer imaging section 23. The inner imaging section 24 is positioned on the inner side surface of the upper housing 21 at a position reverse of the middle position between the left and the right imaging sections of the outer imaging section 23. Thus, when a user views the upper LCD 22 from the front thereof, the inner imaging section 24 can take an image of a face of the user from the front thereof. Further, the left and the right imaging sections of the outer imaging section 23 do not interfere with the inner imaging section 24 inside the upper housing 21, thereby enabling reduction of the thickness of the upper housing 21.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. As shown in FIG. 1 to FIG. 3, the 3D adjustment switch 25 is provided at the end portions of the inner side surface and the right side surface of the upper housing 21, and is positioned at a position at which the 3D adjustment switch 25 is visible to a user when the user views the upper LCD 22 from the front thereof. Further, an operation section of the 3D adjustment switch 25 projects on the inner side surface and the right side surface, and can be viewed and operated from both sides. All the switches other than the 3D adjustment switch 25 are provided on the lower housing 11.

Figure 5:
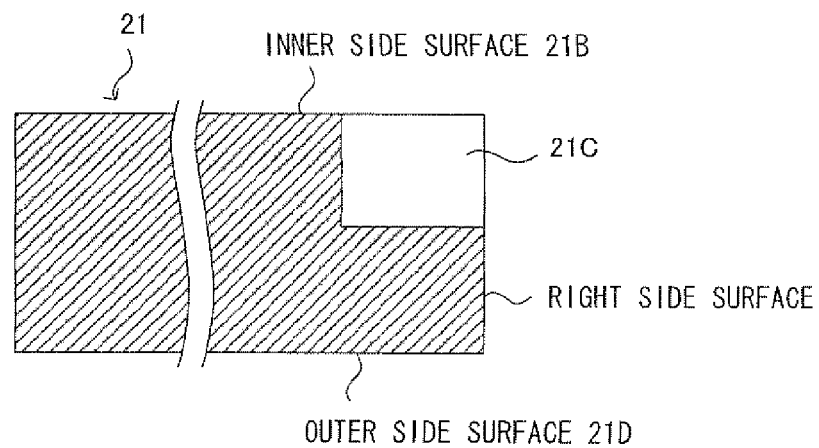
FIG. 5 is a cross-sectional view of the upper housing 21 shown in FIG. 1 along lines A-A'.

FIG. 5 is a cross-sectional view of the upper housing 21 shown in FIG. 1 taken along a line A-A'. As shown in FIG. 5, a recessed portion 21C is formed at the right end portion of the inner side surface of the upper housing 21, and the 3D adjustment switch 25 is provided in the recessed portion 21C. The 3D adjustment switch 25 is provided so as to be visible from the front surface and the right side surface of the upper housing 21 as shown in FIG. 1 and FIG. 2. A slider 25*a* of the 3D adjustment switch 25 is slidable to any position in a predetermined direction (along the longitudinal direction of the right side surface), and a display mode of the upper LCD 22 is determined in accordance with the position of the slider 25*a*.

Figure 6A:
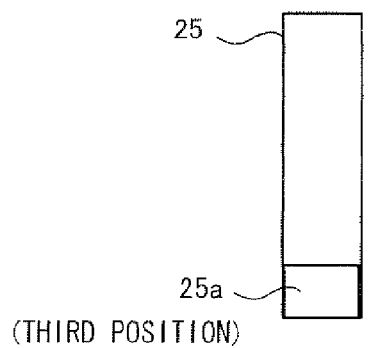
FIG. 6A is a diagram illustrating a state in which a slider 25a of a 3D adjustment switch 25 is positioned at a lowermost position (a third position)
Figure 6B:
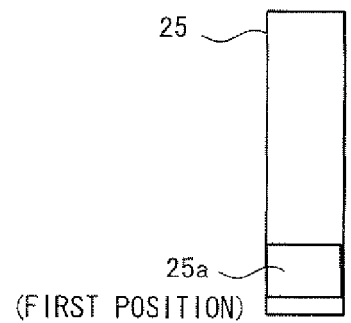
FIG. 6B is a diagram illustrating a state in which the slider 25a of the 3D adjustment switch 25 is positioned above the lowermost position (a first position)
Figure 6C:
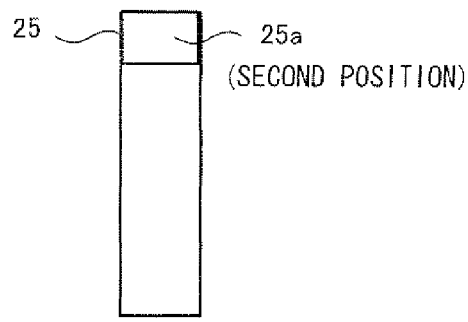
FIG. 6C is a diagram illustrating a state in which the slider 25a of the 3D adjustment switch 25 is positioned at an uppermost position (a second position)

FIG. 6A to FIG. 6C are each a diagram illustrating a state in which the slider 25*a* of the 3D adjustment switch 25 slides. FIG. 6A is a diagram illustrating a state in which the slider 25*a* of the 3D adjustment switch 25 is positioned at the lowermost position (a third position). FIG. 6B is a diagram illustrating a state in which the slider 25*a* of the 3D adjustment switch 25 is positioned above the lowermost position (a first position). FIG. 6C is a diagram illustrating a state in which the slider 25*a* of the 3D adjustment switch 25 is positioned at the uppermost position (a second position).

As shown in FIG. 6A, when the slider 25*a* of the 3D adjustment switch 25 is positioned at the lowermost position (the third position), the upper LCD 22 is set to the planar display mode, and a planar image is displayed on the screen of the upper LCD 22 (the upper LCD 22 may remain set to the stereoscopic display mode, and the same image may be used for the image for a left eye and the image for a right eye, to perform planar display). On the other hand, when the slider 25*a* is positioned between a position shown in FIG. 6B (a position (first position) above the lowermost position) and a position shown in FIG. 6C (the uppermost position (the second position)), the upper LCD 22 is set to the stereoscopic display mode. In this case, a stereoscopically visible image is displayed on the screen of the upper LCD 22. When the slider 25*a* is positioned between the first position and the second position, a manner in which the stereoscopic image is visible is adjusted in accordance with the position of the slider 25*a*. Specifically, an amount of deviation in the horizontal direction between a position of an image for a right eye and a position of an image for a left eye is adjusted in accordance with the position of the slider 25*a*. An adjustment for a manner in which a stereoscopic image is visible in the stereoscopic display mode will be described below. The slider 25*a* of the 3D adjustment switch 25 is configured so as to be fixed at the third position, and is slidable, along the longitudinal direction of the right side surface, to any position between the first position and the second position. For example, the slider 25*a* is fixed at the third position by a projection (not shown) which projects, from the side surface of the 3D adjustment switch 25, in the lateral direction shown in FIG. 6A, and does not slide upward from the third position unless a predetermined force or a force greater than the predetermined force is applied upward. When the slider 25*a* is positioned between the third position and the first position, the manner in which the stereoscopic image is visible is not adjusted, which is intended as a margin. In another embodiment, the third position and the first position may be the same position, and, in this case, no margin is provided. Further, the third position may be provided between the first position and the second position. In this case, a direction in which an amount of deviation in the horizontal direction between a position of an image for a right eye and a position of an image for a left eye is adjusted when the slider is moved from the third position toward the first position, is opposite to a direction in which an amount of deviation in the horizontal direction between the position of the image for the right eye and the position of the image for the left eye is adjusted when the slider is moved from the third position toward the second position.

The program executed by the game apparatus according to the present embodiment includes a program for displaying a stereoscopic photograph, and a program for displaying a stereoscopic CG image. The program for displaying a stereoscopic CG image is used for taking an image of a virtual space by means of a virtual camera for a left eye and a virtual camera for a right eye to generate an image for the left eye and an image for the right eye. The game apparatus according to the present embodiment adjusts the stereoscopic effect by changing a distance between the two virtual cameras in accordance with the position of the slider 25*a* of the 3D adjustment switch 25 when executing such a program.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed (namely, image processing in which an image for a left eye is different from an image for a right eye is performed in the case of the 3D adjustment switch being positioned between the first position and the second position) in a state where the upper LCD 22 is in the stereoscopic display mode. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 43 descried below.

(Internal Configuration of Game Apparatus 10)

Figure 7:
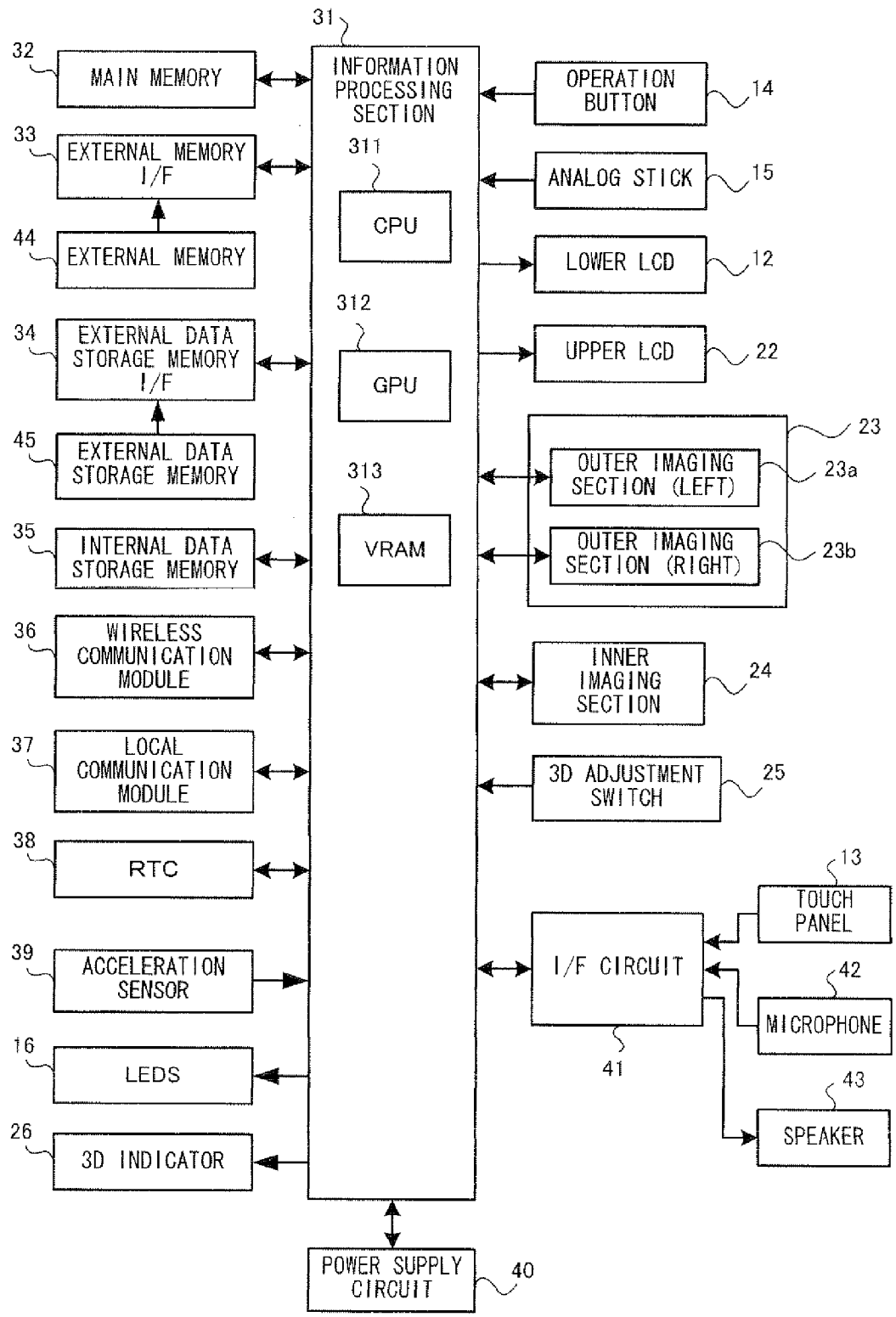
FIG. 7 is a block diagram illustrating an internal configuration of the game apparatus 10.

Next, an internal electrical configuration of the game apparatus 10 will be described with reference to FIG. 7. FIG. 7 is a block diagram illustrating an internal configuration of the game apparatus 10. As shown in FIG. 7, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. In the present embodiment, a predetermined program is stored in a memory (for example, the external memory 44 connected to the external memory I/F 33 or the internal data storage memory 35) inside the game apparatus 10. The CPU 311 of the information processing section 31 executes a process (FIG. 11) for a puzzle game described below by executing the predetermined program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12. In the present embodiment, the VRAM 313 includes a storage area for the lower LCD 12 and a storage area for the upper LCD 22 (hereinafter, referred to as a texture VRAM).

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the process for the puzzle game, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the lower LCD 12 to display an image for operation, and causes the upper LCD 22 to display an image acquired from one of the imaging sections 23 or 24. That is, the information processing section 31 causes the upper LCD 22 to display a stereoscopic image (stereoscopically visible image) using an image for a right eye and an image for a left eye which are taken by the outer imaging section 23, and causes the upper LCD 22 to display a planar image taken by the inner imaging section 24, for example.

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye, (taken by the outer imaging section 23), which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31. In the present embodiment, the information processing section 31 issues an instruction for taking an image to one of the outer imaging section 23 or the inner imaging section 24, and the imaging section which receives the instruction for taking an image takes an image and transmits data of the taken image to the information processing section 31. Specifically, in the present embodiment, a user selects the imaging section to be used through a touch operation using the touch panel 13. When the information processing section 31 (the CPU 311) detects that the imaging section is selected, the information processing section 31 instructs one of the outer imaging section 32 or the inner imaging section 24 to take an image.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. In the present embodiment, the information processing section 31 lights up the 3D indicator 26 when the upper LCD 22 is in the stereoscopic display mode. The game apparatus 10 has the internal configuration as described above.

(Details of Process for Puzzle Game)

Figure 8:
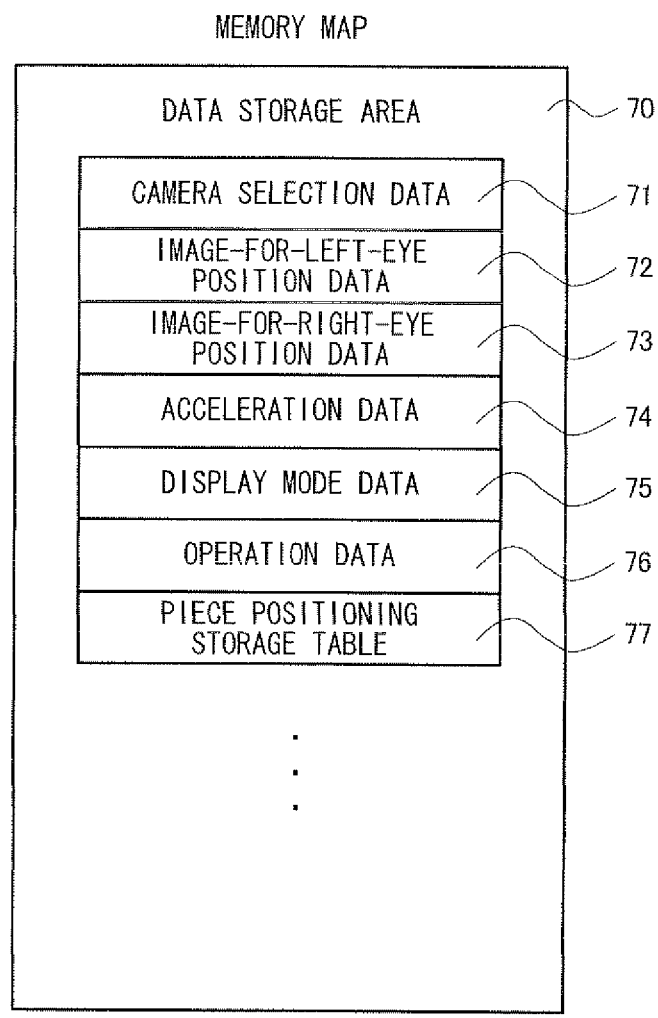
FIG. 8 is a diagram illustrating a memory map of a main memory 32 of the game apparatus 10.

Next, a process for a puzzle game according to the present embodiment will be described in detail with reference to FIG. 8 to FIG. 11. Initially, main data to be stored in the main memory 32 for performing a process for a puzzle game will be described. FIG. 8 is a diagram illustrating a memory map of the main memory 32 of the game apparatus 10. As shown in FIG. 8, the main memory 32 has a data storage area 70. Camera selection data 71, image-for-left-eye position data 72, image-for-right-eye position data 73, acceleration data 74, display mode data 75, operation data 76, a piece positioning storage table 77, and the like are stored in the data storage area 70. In addition to the data described above, programs for executing the imaging process described above, data representing a touch position on the touch panel 13, data representing an image which is displayed on the lower LCD 12 for selection of a camera, data used for a game process (for example, selection-confirmed piece information, stage information, and the like), and the like are stored in the main memory 32. In the following description, the "imaging section" may be referred to as a "camera".

The camera selection data 71 represents the imaging section which has been most recently selected. The camera selection data 71 indicates whether the most recently selected imaging section is the outer imaging section 23 or the inner imaging section 24.

The image-for-left-eye position data 72 represents a position at which the image for a left eye which has been taken by the outer imaging section (left) 23a is displayed on the upper LCD 22, and represents a coordinate value of the image center of the image for the left eye. The image-for-right-eye position data 73 represents a position at which the image for a right eye which has been taken by the outer imaging section (right) 23b is displayed on the upper LCD 22, and represents a coordinate value of the image center of the image for the right eye.

The acceleration data 74 represents an acceleration which has been most recently detected by the acceleration sensor 39. Specifically, the acceleration data 74 represents values of an x-axial direction acceleration, a y-axial direction acceleration, and a z-axial direction acceleration which are detected by the acceleration sensor 39. The acceleration sensor 39 detects an acceleration every predetermined time, and transmits the acceleration to the information processing section 31 (CPU 311). The information processing section 31 updates the acceleration data 74 stored in the main memory 32 each time the acceleration sensor 39 detects an acceleration.

The display mode data 75 indicates whether the display mode of the upper LCD 22 is the stereoscopic display mode or the planar display mode.

The operation data 76 represents an operation performed on each of the operation buttons 14A to 14E and 14G to 14H, and the analog stick 15.

The piece positioning storage table 77 has stored therein positioning state of the puzzle pieces used in the process for the puzzle game, and the like. In the puzzle game, a plurality of puzzle pieces are used, and the puzzle pieces are positioned as polygons in a virtual three-dimensional space. FIG. 9 shows the structure of the piece positioning storage table 77. The piece positioning storage table 77 is a table for nine pieces which are arranged in three rows in the horizontal direction, and in three columns in the vertical direction. The piece positioning storage table 77 includes a piece position storage field, a retained arrangement data storage field, and a texture coordinate data storage field representing coordinate data for four points of (X(1),Y(1)), (X(2),Y(2)), (X(3),Y(3)), and (X(4),Y(4)).

The piece position is represented based on, for example, a matrix of three columns×three rows, and a position of the upper left piece is set as "1", a position of the upper center piece is set as "2", a position of the upper right piece is set as "3", a position of the intermediate left piece is set as "4", a position of the intermediate center piece is set as "5", a position of the intermediate right piece is set as "6", a position of the lower left piece is set as "7", a position of the lower center piece is set as "8", and a position of the lower right piece is set as "9". Thus, the piece positions represent positions assigned the upper left position to the lower right position, respectively, which are set in the matrix forming a puzzle area.

The retained arrangement data is one-dimensional arrangement data, and represents piece numbers (numbers assigned before pieces are positioned at random) of the pieces which have been most recently positioned at the piece positions, respectively. The piece numbers of the pieces which have been most recently positioned at the piece positions, respectively, are stored in the ascending order of the piece positions (in the ascending order of the numbers set to the piece positions, respectively), as the retained arrangement data in the piece positioning storage table 77. For example, as shown in FIG. 10(a), before the pieces are positioned at random, "123456789" in which the piece numbers of the pieces positioned at the piece positions, respectively, are arranged in the ascending order of the piece positions, is stored as the one-dimensional arrangement data. As shown in FIG. 10(b), when all the puzzle pieces are positioned at random, "769548321" in which the piece numbers of the pieces positioned at the piece positions, respectively, are arranged in the ascending order of the piece positions is stored as the one-dimensional arrangement data. FIG. 10(b) shows a random arrangement in which any of the puzzle pieces is not positioned at the proper position.

The texture coordinate data is calculated for each puzzle piece based on the tilt of the virtual camera. As described below, the texture coordinate data of the 9 puzzle pieces is calculated, and the texture coordinate data is switched in accordance with the one-dimensional arrangement data, thereby displaying the puzzle pieces positioned at random. The method for calculating the tile of the virtual camera is not limited to any specific method. In the present embodiment, the tilt of the virtual camera is calculated based on a difference between the data of images taken by the outer imaging section 23. More specifically, the movement distance calculated based on the difference is used to calculate the tilt of the virtual camera.

Figure 11:
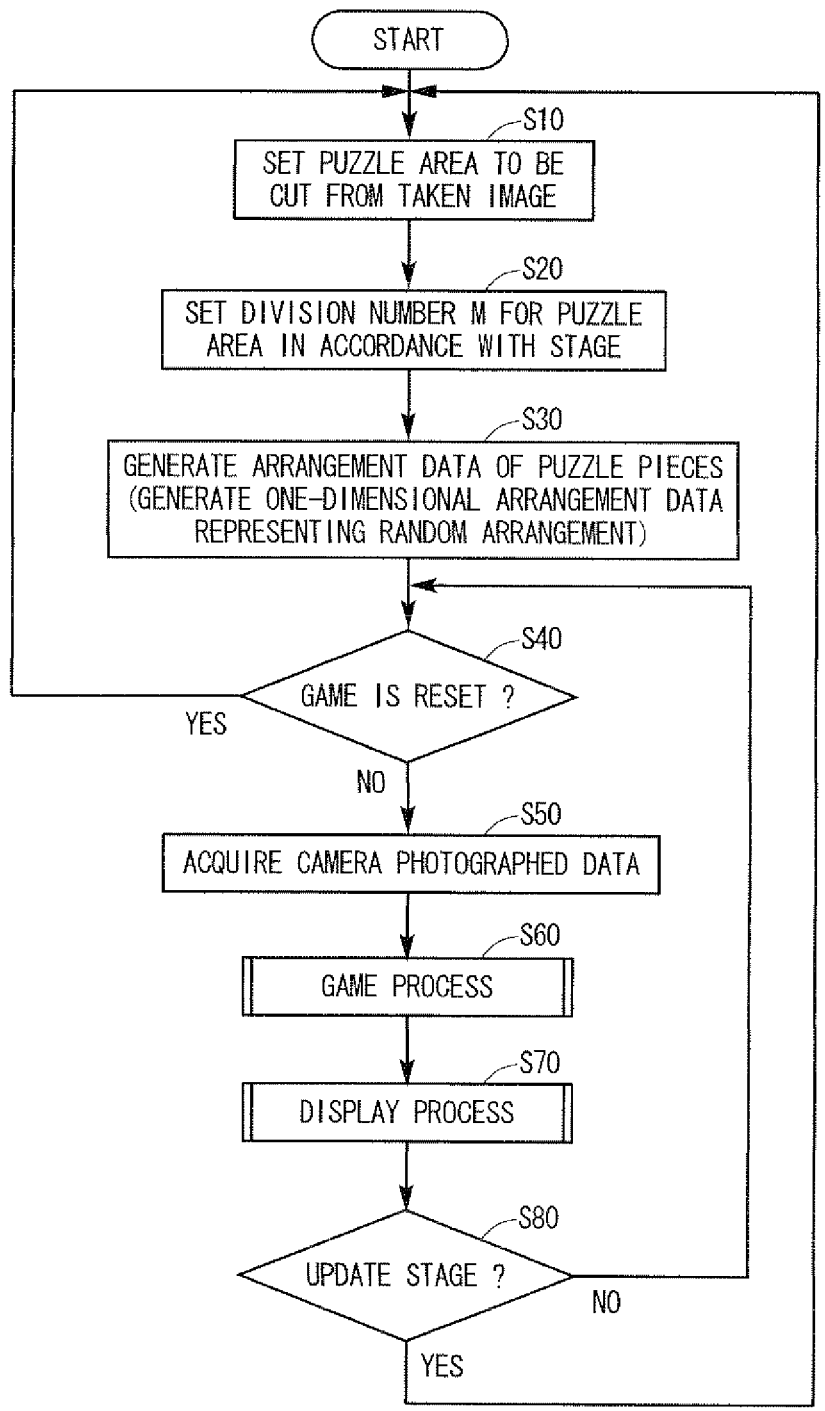
FIG. 11 is a main flow chart showing in detail a process for a puzzle game according to an embodiment.

Next, the process for the puzzle game will be described in detail with reference to FIG. 11 to FIG. 13. FIG. 11 is a main flow chart showing in detail the process for the puzzle game according to the present embodiment. When the game apparatus 10 is powered on, the information processing section 31 (the CPU 311) of the game apparatus 10 executes a start-up program stored in a ROM which is not shown, thereby initializing the respective units such as the main memory 32. Next, a puzzle game process program stored in the internal data storage memory 35 is loaded to the main memory 32, and the execution of the program is stared by the CPU 311 of the information processing section 31.

Figure 12:
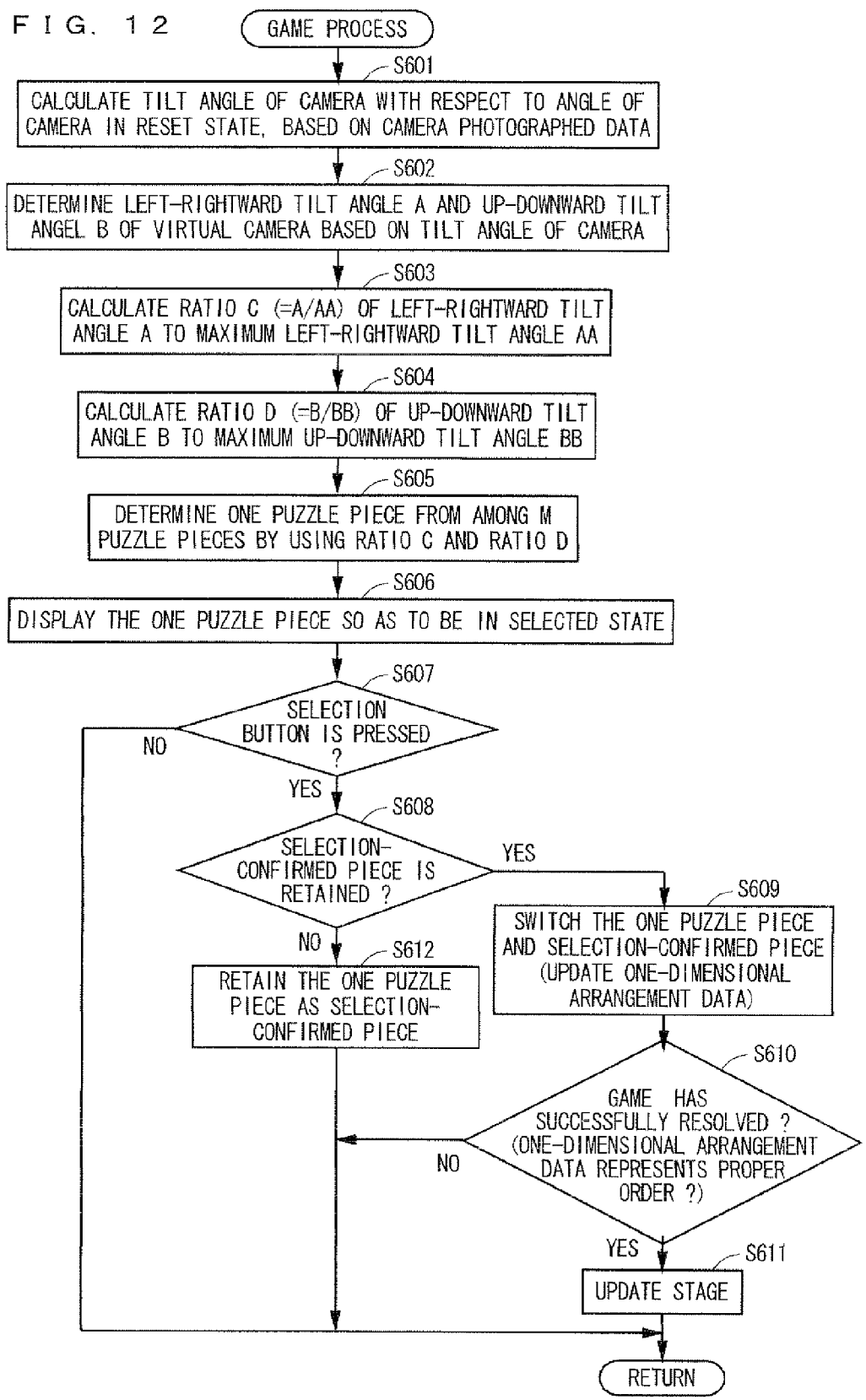
FIG. 12 is a flow chart showing in detail a game process (step S60) shown in FIG. 11.
Figure 13:
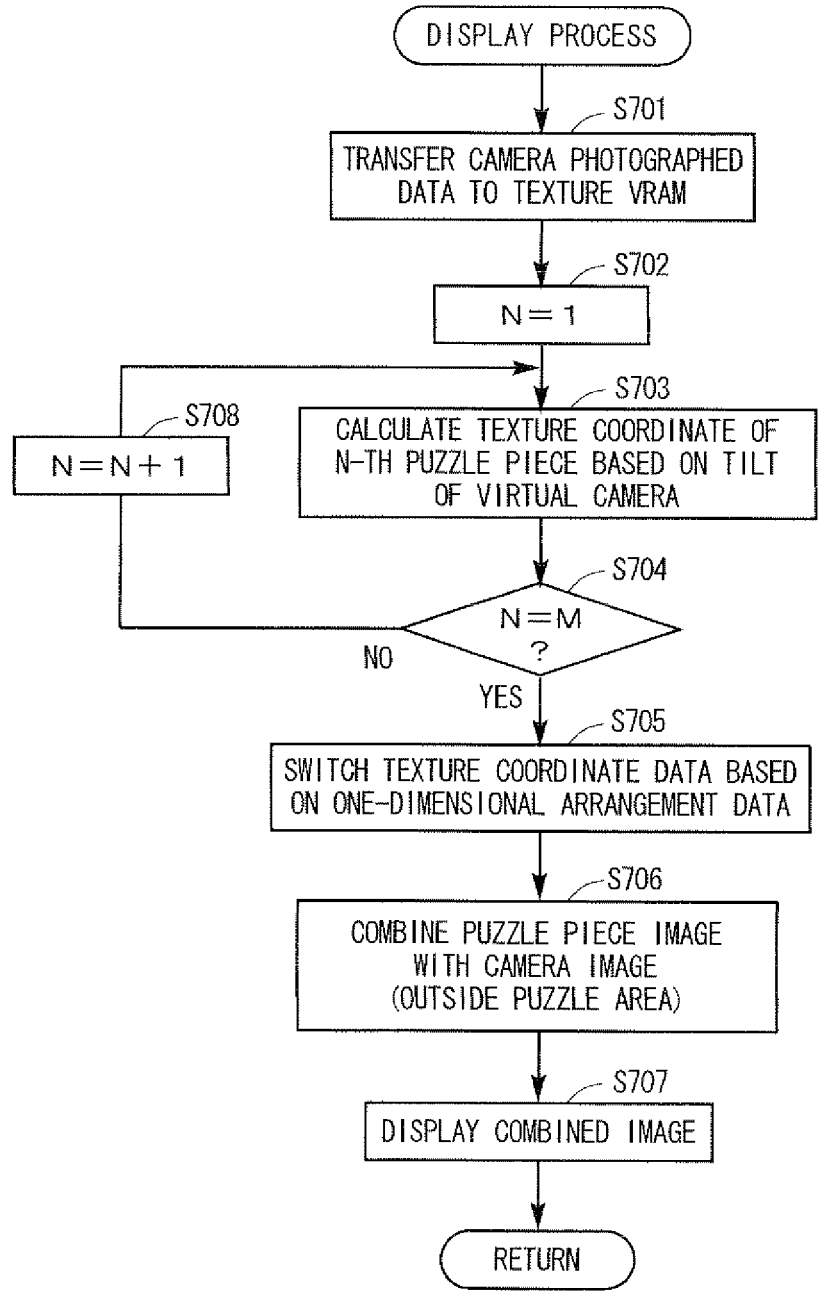
FIG. 13 is a flow chart showing in detail a display process (step S70) shown in FIG. 11.

FIG. 12 is a flow chart showing in detail a game process (step S60) shown in FIG. 11. FIG. 13 is a flow chart showing in detail a display process (step S70) shown in FIG. 11. A process loop of steps S10 to S80 shown in FIG. 12 is repeatedly executed in each frame (one frame corresponds to, for example, 1/30 seconds, and this is referred to as a frame time).

A process performed when the outer imaging section 23 is selected, and the stereoscopic display mode is selected will be described below. In this process, moving images displayed on the puzzle pieces are stereoscopically displayed, which is advantageous in enhancing the user's interest. A process for a left eye and a process for a right eye which are performed in the stereoscopic display mode are fundamentally the same. Therefore, the process for a left eye (or the process for a right eye) will be described below to avoid repeated description. This corresponds to the description for the process in the planar display mode. Thus, the application of the present invention is not limited to one of the stereoscopic display mode or the planar display mode. The stereoscopic display mode is more preferable because the stereoscopic display mode enhances the user's interest. In the stereoscopic display mode, the process for a right eye, which is fundamentally the same as the process for a left eye, is executed in addition to the process for the left eye described below, or data for a right eye is generated by using the result of the process for a left eye, thereby executing the process for the puzzle game in the stereoscopic display mode.

Further, although the game apparatus 10 which causes the upper LCD 22 to display the puzzle game will be described below, the lower LCD 12 may be caused to display the puzzle game. In this case, a puzzle piece displayed on the lower LCD 12 may be designated by using the touch pen 28, to select the puzzle piece to be switched.

Firstly, a main routine of the process for the puzzle game will be described with reference to FIG. 11. In step S10, the information processing section 31 sets a puzzle area (a predetermined area) to be cut from an image taken by the outer imaging section 23. At this time, an area smaller than a display area of the upper LCD 22 is set as the puzzle area. The taken image outside the puzzle area can be displayed on the upper LCD 22 in this setting, thereby providing a user with a hint to the puzzle game. In a case where the setting for the upper LCD 22 is such that an image taken by the outer imaging section 23 is displayed not on the entire area of the upper LCD 22 but on a part of the area of the upper LCD 22, the puzzle area is set as an area smaller than the part of the area of the upper LCD 22 for displaying the taken image.

In step S20, the information processing section 31 sets, in accordance with a stage, a division number M representing the number of areas into which the puzzle area is divided. At this time, when the stage is high (when the user's skill is high), the division number is set so as to be increased, whereas when the stage is low (when the user's skill is low), the division number is set so as to be reduced. The size of the puzzle area is unchanged regardless of the division number M. At this time, the information processing section 31 positions, in a virtual three dimensional space, a virtual camera, and a plurality of polygons corresponding to the plurality of puzzle pieces into which the puzzle area is divided. A positional relationship between each polygon and the virtual camera is preset.

In step S30, the information processing section 31 generates the one-dimensional arrangement data for the puzzle pieces. At this time, the one-dimensional arrangement data is generated which represents an arrangement in which the puzzle pieces are positioned at random so as to prevent the puzzle pieces from forming the same image as the taken image. It is preferable to generate the one-dimensional arrangement data such that none of the puzzle pieces is positioned at the same position as in the taken image (that is, it is preferable to generate the one-dimensional arrangement data so as to position the puzzle pieces completely at random). However, when the division number M is increased, a time period required for the process step of step S30 may be increased. Therefore, when the one-dimensional arrangement data cannot be generated, within a predetermined time period, so as to prevent all the puzzle pieces from being positioned at the same positions, respectively, as in the taken image (when the puzzle pieces cannot be positioned completely at random), data representing the most random arrangement which is obtained within the predetermined time period may be used as the one-dimensional arrangement data, or data obtained at a time at which the predetermined time period has elapsed may be used as the one-dimensional arrangement data.

In step S40, the information processing section 31 determines whether or not a game reset is required by a user. For example, the information processing section 31 determines that the game reset is required when a button corresponding to the game reset is operated. When the information processing section 31 determines that the game reset is required (YES in step S40), the process is returned to step S10. Otherwise (NO in step S40), the process is shifted to step S50. That is, when a reset process is required halfway in the game, the process step of step S10 is performed, and a relative positional relationship between the virtual camera and the puzzle area is initialized, and the puzzle area is set again.

In step S50, the information processing section 31 acquires camera photographed data. Specifically, the information processing section 31 acquires image data representing an image taken by the camera having been most recently selected, and stores the mage data in the VRAM 313. In the present embodiment, the outer imaging section 23 is selected, and therefore the information processing section 31 acquires the image data representing an image taken by the outer imaging section 23.

In step S60, the information processing section 31 performs a game process for selecting a puzzle piece in accordance with the game apparatus 10 being tilted by a user. The game process of step S60 is shown as a sub-routine, and will be described below in detail.

In step S70, the information processing section 31 performs a display process for displaying an image on the upper LCD 22. The display process of step S70 is shown as a sub-routine, and will be described below in detail In step S80, the information processing section 31 determines whether or not a stage is updated. When the puzzle pieces are switched so as to position all the puzzle pieces at proper positions, the information processing section 31 determines that the stage is updated. When it is determined that the stage is updated (YES in step S80), the process is shifted to step S10. Otherwise (NO in step S80), the process is shifted to step S40.

In the flow chart shown in FIG. 11, it appears that the puzzle game is endlessly performed. In practice, when, for example, the power button 14F is powered off, the puzzle game is ended.

Next, the sub-routine of the game process will be described with reference to FIG. 12. In step S601, the information processing section 31 calculates a tilt angle of the outer imaging section 23, based on the camera photographed data representing an image taken by the outer imaging section 23, and the tilt angle to be calculated is an angle between a most recently obtained tilt angle of the outer imaging section 23 and an angle of the outer imaging section 23 which is obtained at the resetting (when the puzzle area is set). At this time, the information processing section 31 calculates a movement distance of the outer imaging section 23, based on a difference between the camera photographed data having been obtained in the most recent frame, and the camera photographed data having been obtained in a frame immediately preceding the most recent frame, and calculates the tilt angle based on the movement distance. At this time, the tilts in the left-rightward direction and the up-downward (forward-backward) direction are calculated.

In step S602, the information processing section 31 determines a left-rightward tilt angle A and an up-downward tilt angle B of the virtual camera, based on the camera tilt angle having been calculated.

In step S603, the information processing section 31 calculates a ratio C (=A/AA) of the left-rightward tilt angle A to a maximum left-rightward tilt angle AA. In step S604, the information processing section 31 calculates a ratio D (=B/BB) of the up-downward tilt angle B to a maximum up-downward tilt angle BB. When the ratio C or the ratio D is greater than 1, the ratio C or the ratio D is set to 1.

In step S605, the information processing section 31 selects one puzzle piece from among M puzzle pieces based on the ratio C and the ratio D. At this time, a selection cursor (a cross mark) is displayed on the upper LCD 22 so as to be put on the puzzle piece. Even when the game apparatus 10 is greatly tilted, the selection cursor does not move to the outside of the puzzle piece area, and one puzzle piece can be always selected. Further, when the puzzle piece is selected, the puzzle piece positioned at the end portion is more likely to be selected than the puzzle piece positioned at the center. This process will be described below in detail.

In step S606, the information processing section 31 displays, on the upper LCD 22, the selected puzzle piece so as to be in a selected state. At this time, on the upper LCD 22, the selection cursor is displayed on the selected puzzle piece, and the selected puzzle piece is displayed such that a puzzle frame thereof is highlighted and thickened, or a color of the puzzle frame thereof is changed, or the selected puzzle piece is displayed as if the puzzle piece projects.

In step S607, the information processing section 31 determines whether or not the selection button has been pressed. At this time, the information processing section 31 determines that the selection button has been pressed when, for example, the operation button 14B is pressed by a user. When it is determined that the selection button has been pressed (YES in step S607), the process is shifted to step S608. Otherwise (NO in step S607), the process is ended (is returned to the main routine).

In step S608, the information processing section 31 determines whether or not a selection-confirmed piece is retained. At this time, the information processing section 31 determines that the selection-confirmed pieces is retained, when selection-confirmed piece number data representing a selection-confirmed piece number, and piece position data representing a piece position are stored as selection-confirmed piece information in the data storage area 70 of the main memory 32. When the selection-confirmed piece number data and the piece position data are not stored, the information processing section 31 does not determine that the selection-confirmed pieces is retained. When it is determined that the selection-confirmed piece is retained (YES in step S608), the process is shifted to step S609. Otherwise (NO in step S608), the process is shifted to step S612.

In step S609, the information processing section 31 switches the corresponding puzzle piece (the puzzle piece having been most recently selected) and the selection-confirmed piece having been retained. At this time, the information processing section 31 updates the one-dimensional arrangement data which is stored as the retained arrangement data in the data storage area 70. For example, when the puzzle piece positioned at the upper center position and the puzzle piece positioned at the upper right position are switched, the one-dimensional arrangement data is updated from "769548321" which indicates that the puzzle pieces are arranged in the order of "7→6→9→5→4→8→3→2→1" to "796548321" which indicates that the puzzle pieces are arranged in the order of "7→9→6→5→4→8→3→2→1". At this time, the information processing section 31 erases the selection-confirmed piece number data and the piece position data which are stored in the data storage area 70 of the main memory 32.

In step S610, the information processing section 31 determines whether or not the game has successfully resolved. At this time, the information processing section 31 determines that the game has successfully resolved when the one-dimensional arrangement data, which is stored as the retained arrangement data, represents "123456789" which corresponds to the proper order. That is, the information processing section 31 determines that the game has successfully resolved when the puzzle pieces are returned to an arranged state which has been set before the puzzle pieces are positioned at random so as to prevent the puzzle pieces from forming the same image as the taken image (as in step S30). When it is determined that the game has successfully resolved (YES in step S610), the process is shifted to S611. Otherwise (No in step S610), the process is ended (is returned to the main routine).

In step S611, the information processing section 31 updates stage information. Thereafter, the process is ended (is returned to the main routine).

In step S612, the information processing section 31 retains the corresponding puzzle piece (the puzzle piece having been most recently selected) as the selection-confirmed piece. At this time, the information processing section 31 stores the number of and the position of the corresponding puzzle piece as the selection-confirmed piece number data and the piece position data, respectively, in the data storage area 70 of the main memory 32. Thereafter, the process is ended (is returned to the main routine).

Next, the sub-routine of the display process of the upper LCD 22 will be described with reference to FIG. 13. In step S701, the information processing section 31 transfers the camera photographed data to the texture VRAM.

In step S702, the information processing section 31 assigns 1 to a variable N. In step S703, the information processing section 31 calculates a texture coordinate of the N-th puzzle piece (a puzzle piece of the piece position "N"), based on the tilt of the virtual camera (which is determined in step S602 and stored in the data storage area 70). At this time, the texture coordinate obtained before the puzzle pieces are positioned at random is calculated. The calculated texture coordinate is stored in the texture coordinate data storage field of the piece positioning storage table 77.

In step S704, the information processing section 31 determines whether or not the variable N is equal to M. When N (variable)=M (the number of pieces in which the puzzle is divided, the number of pieces) is satisfied (YES in step S704), the process is shifted to step S705. Otherwise (NO in step S704), the process is shifted to step S708.

In step S705, the information processing section 31 switches the texture coordinate data in accordance with the one-dimensional arrangement data stored in the retained arrangement data storage field of the piece positioning storage table 77. The information processing section 31 pastes a texture onto a polygon of each puzzle piece based on the texture coordinate data having been switched, to generate a puzzle piece image. In step S706, the information processing section 31 combines the puzzle piece image with the camera image (the image outside the puzzle area). In step S707, the information processing section 31 displays the combined image on the upper LCD 22. Thereafter, the process is ended (is returned to the main routine).

In step S708, the information processing section 31 adds 1 to the variable N. Thereafter, the process is shifted to step S703, and the process step of step S703 is repeated until the texture coordinates for all the puzzle pieces are calculated.

Figure 14:
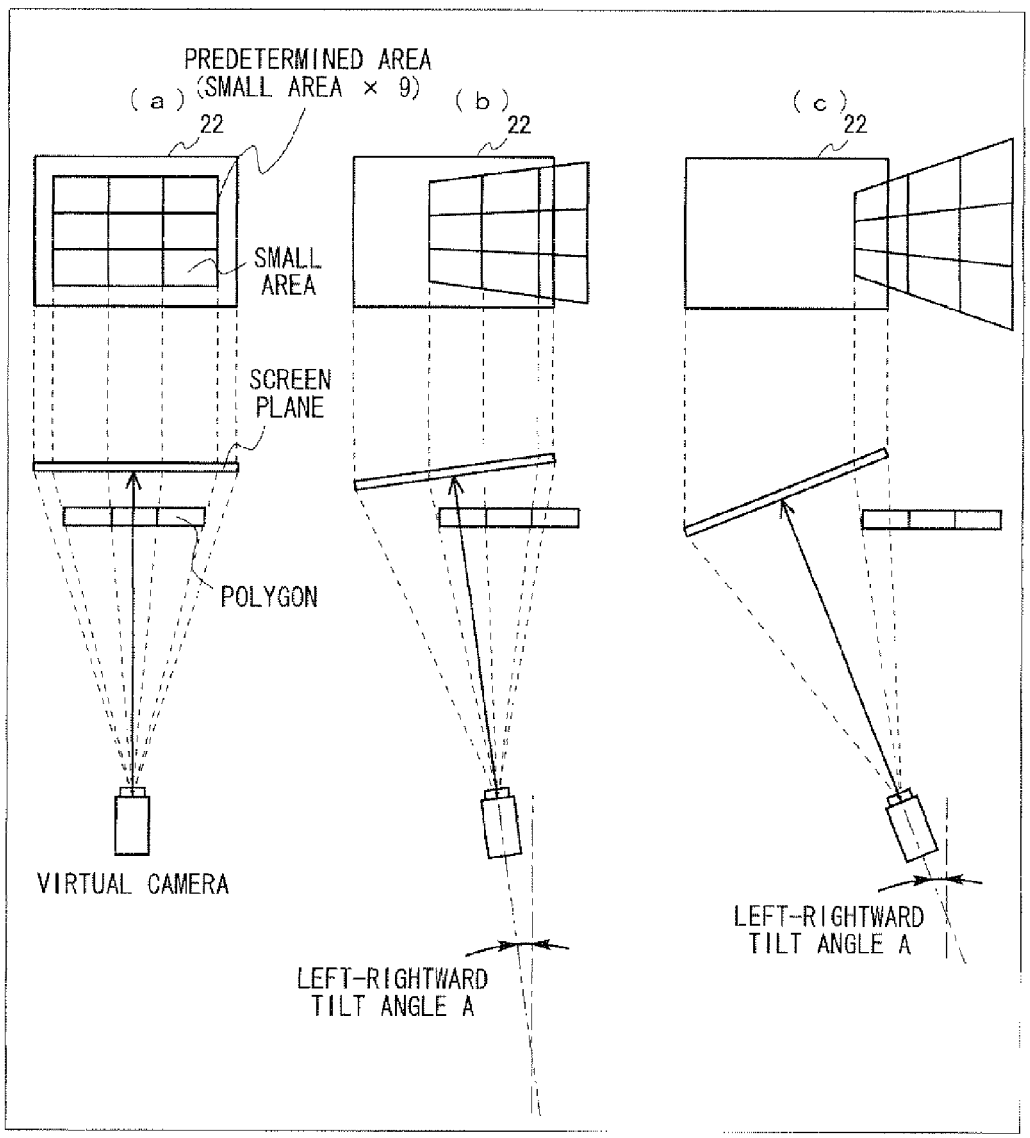
FIG. 14 is a conceptual diagram showing a manner in which puzzles are visible when the game apparatus is tilted.

An operation performed by the game apparatus 10 according to the present embodiment based on the configuration and the flow chart as described above will be described with reference to conceptual diagrams of FIG. 14 to FIG. 16, and exemplary screen displays shown in FIG. 17 and FIG. 18. The game apparatus 10 operates as described below by the program shown above in FIG. 11 to FIG. 13 being cyclically executed in each frame time (cycle time).

(Setting of Puzzle Area)

The program described above is set to be executed when a user selects the outer imaging section 23 and selects the planar display mode. For example, when a user operates a button for reset while taking an image of a range including a tree, a clock tower, the sun, a cloud, and a house, by using the outer imaging section 23, a puzzle area which is smaller than an area of the taken image displayed on the upper LCD 22 is cut from the taken image, and is set (step S10). The division number M for the puzzle area is set (in this description, M=9), and the one-dimensional arrangement data of the puzzle pieces is generated (step S20, step S30).

(Image Displayed when Game Apparatus is Tilted)

An image which is displayed on the upper LCD 22 when a user tilts the game apparatus 10 in the left-rightward direction in a state where the puzzle area is set as described above, will be described with reference to FIG. 14. A case where a user tilts the game apparatus 10 in the up-downward direction can be described by rotating FIG. 14 by 90 degrees, and therefore no description thereof is given. In FIG. 14 to FIG. 18, some portions may be emphasized to aid in understanding the invention.

FIG. 14(a) shows a relative positional relationship among the virtual camera, polygons corresponding to the puzzle pieces, and an image displayed on the upper LCD 22, and the relative positional relationship is set when the puzzle area is set in step S10.

As shown in FIG. 14(a), the puzzle area (a predetermined area) which is displayed, on the upper LCD 22, so as to be smaller than a range of an image taken by the outer imaging section 23 is divided into 9 puzzle pieces (small areas). When the outer imaging section 23 of the game apparatus 10 is oriented leftward (which is equivalent to a state in which the game apparatus 10 is oriented leftward from the viewpoint of the configuration of the game apparatus 10) in a state shown in FIG. 14(a), the state shown in FIG. 14(a) shifts to a state shown in FIG. 14(b). At this time, the camera photographed data representing an image taken by the outer imaging section 23 is acquired (step S50), and the tilt angle of the camera relative to the camera positioned in the state shown in FIG. 14(a) is calculated based on the camera photographed data (step S601), thereby determining the left-rightward tilt angle A of the virtual camera (step S602).

The camera photographed data representing the image taken by the outer imaging section 23 is transferred to the texture VRAM (step S701), and the texture coordinates of the 9 puzzle pieces are calculated (step S703). Specifically, the coordinates of corners of each polygon representing the corresponding puzzle piece are projected on a screen plane, thereby calculating the texture coordinates of the respective corners of each puzzle piece. The texture coordinate data are switched based on the one-dimensional arrangement data (step S705), and the puzzle piece image and the camera image (outside the puzzle area) are combined with each other (step S706), thereby displaying the combined image on the upper LCD 22 (step S707).

As described above, when a user orients the game apparatus 10 leftward so as to shift the state shown in FIG. 14(a) to the state shown in FIG. 14(b), the imaging direction of the outer imaging section 23 is oriented leftward. The texture coordinates of the 9 puzzle pieces are calculated based on the tilt of the virtual camera. As shown in FIG. 14(b), the rectangular puzzle area shown in FIG. 14(a) is displayed so as to be shifted rightward, and the puzzle pieces are displayed so as to be enlarged toward the right side. This is because a distance between the game apparatus 10 and an object positioned on the right side of the field of view of the outer imaging section 23 becomes shorter than a distance between the game apparatus 10 and an object positioned on the left side of the field of view of the outer imaging section 23. The puzzle area is moved and displayed in a direction opposite to the direction toward which the outer imaging section 23 is oriented, and the puzzle area is displayed so as to be enlarged toward the opposite direction. In this case, a part of the puzzle area is displayed outside the display range of the upper LCD 22, that is, the part of the puzzle area is not displayed on the upper LCD 22.

When a user tilts the camera device 10 leftward in the state shown in FIG. 14(b), the state shown in FIG. 14(b) shifts to a state shown in FIG. 14(c). The puzzle area to be displayed is further moved in a direction opposite to the direction toward which the outer imaging section 23 is oriented, and the puzzle area to be displayed is enlarged toward the opposite direction, as compared to the state shown in FIG. 14(b). However, in this case, the puzzle area is displayed outside the display range of the upper LCD 22, and only a part of the puzzle area is displayed on the upper LCD 22.

(Selection Mark Displayed when Game Apparatus is Tilted)

In the game apparatus 10 according to the present embodiment, when the game apparatus 10 is tilted in order to select a puzzle piece, the imaging direction of the outer imaging section 23 is tilted. The selection cursor (cross mark) which is displayed on the upper LCD 22 when a user tilts the game apparatus 10 in the left-rightward direction in order to select a puzzle piece in a state where the puzzle area is set will be described with reference to FIG. 15. A case where a user tilts the game apparatus 10 in the up-downward direction can be described by rotating FIG. 15 by 90 degrees as described for FIG. 14, and no description thereof is given. Although the division number M is different between in FIG. 14 and in FIG. 15 (M=9 in FIG. 14, and M=25 in FIG. 15), FIG. 15(a), FIG. 15(b), and FIG. 15(c) correspond to FIG. 14(a), FIG. 14(b), and FIG. 14(c), respectively.

When the game apparatus 10 is oriented leftward in a state shown in FIG. 15(a), the state shown in FIG. 15(a) shifts to a state shown in FIG. 15(b). The selection cursor for selecting a puzzle piece is displayed at almost the center of the upper LCD 22 when the game apparatus 10 is not tilted as in the state shown in FIG. 15(a). If the selection cursor is to be displayed at almost the center of the upper LCD 22 also when the game apparatus 10 is tilted, the selection cursor may be displayed at a position of the selection cursor (as an outline cross mark) shown in FIG. 15(b), and the puzzle piece positioned in the second column from the left is selected. However, the game apparatus 10 according to the present embodiment is set such that a puzzle piece positioned at the end portion is more likely to be selected as compared to a puzzle piece positioned at the center portion. Therefore, the selection cursor is displayed at a position of the selection cursor (as a black cross mark) which is closer to the end portion of the puzzle area than a position of the selection cursor (as the outline cross mark) shown in FIG. 15(b), thereby selecting the puzzle piece positioned at the left end portion. That is, the puzzle piece positioned at a position closer to the end portion can be selected by the game apparatus 10 being slightly tilted.

When a user tilts the camera device 10 leftward in the state shown in FIG. 15(b), the state shown in FIG. 15(b) shifts to a state shown in FIG. 15(c). The selection cursor for selecting a puzzle piece is displayed at almost the center of the upper LCD 22 in the state where the game apparatus 10 is not tilted as shown in FIG. 15(a), or in the state where the game apparatus 10 is tilted as shown in FIG. 15(b). If the selection cursor is to be displayed at almost the center of the upper LCD 22 even when the tilting of the game apparatus 10 is increased, the selection cursor may be displayed at a position of the selection cursor (as the outline cross mark) as shown in FIG. 15(c), and no puzzle piece can be selected. However, the game apparatus 10 according to the present embodiment is set such that one puzzle piece can be always selected. Therefore, the selection cursor is not displayed at a position of the selection cursor (as the outline cross mark) as shown in FIG. 15(c), and the selection cursor (as black cross mark) is displayed so as to select the puzzle piece positioned at the left end portion, thereby enabling the puzzle piece positioned at the left end portion to be selected. That is, if at least a part of the puzzle pieces are displayed on the upper LCD 22, one puzzle piece can be always selected (the puzzle piece positioned at the endmost position can be selected when the camera device 10 is greatly tilted).

As described above, the game apparatus 10 is set such that a puzzle piece positioned at the end portion of the puzzle area is more likely to be selected as compared to a puzzle piece positioned at the center portion thereof, and one puzzle piece can be always selected. Such an operation performed by the game apparatus 10 according to the present embodiment will be more specifically described with reference to FIG. 16. In FIG. 16, the number M of puzzle pieces is 25, which is equal to the number M of the puzzle pieces shown in FIG. 15.

(Operation for Selecting Puzzle Piece)

When a user tilts the game apparatus 10 in order to select a puzzle piece, a tilt angle of the camera is calculated (step S601), and the left-rightward tilt angle A of the virtual camera and the up-downward tilt angle B of the virtual camera are determined (step S602). A ratio C (=A/AA) of the left-rightward tilt angle A to the maximum left-rightward tilt angle AA is calculated, and a ratio D (=B/BB) of the up-downward tilt angle B to the maximum up-downward tilt angle BB is calculated (step S603, step S604). The ratio C and the ratio D having been thus calculated are used to select one puzzle piece from among M puzzle pieces (step S605).

Figure 16:
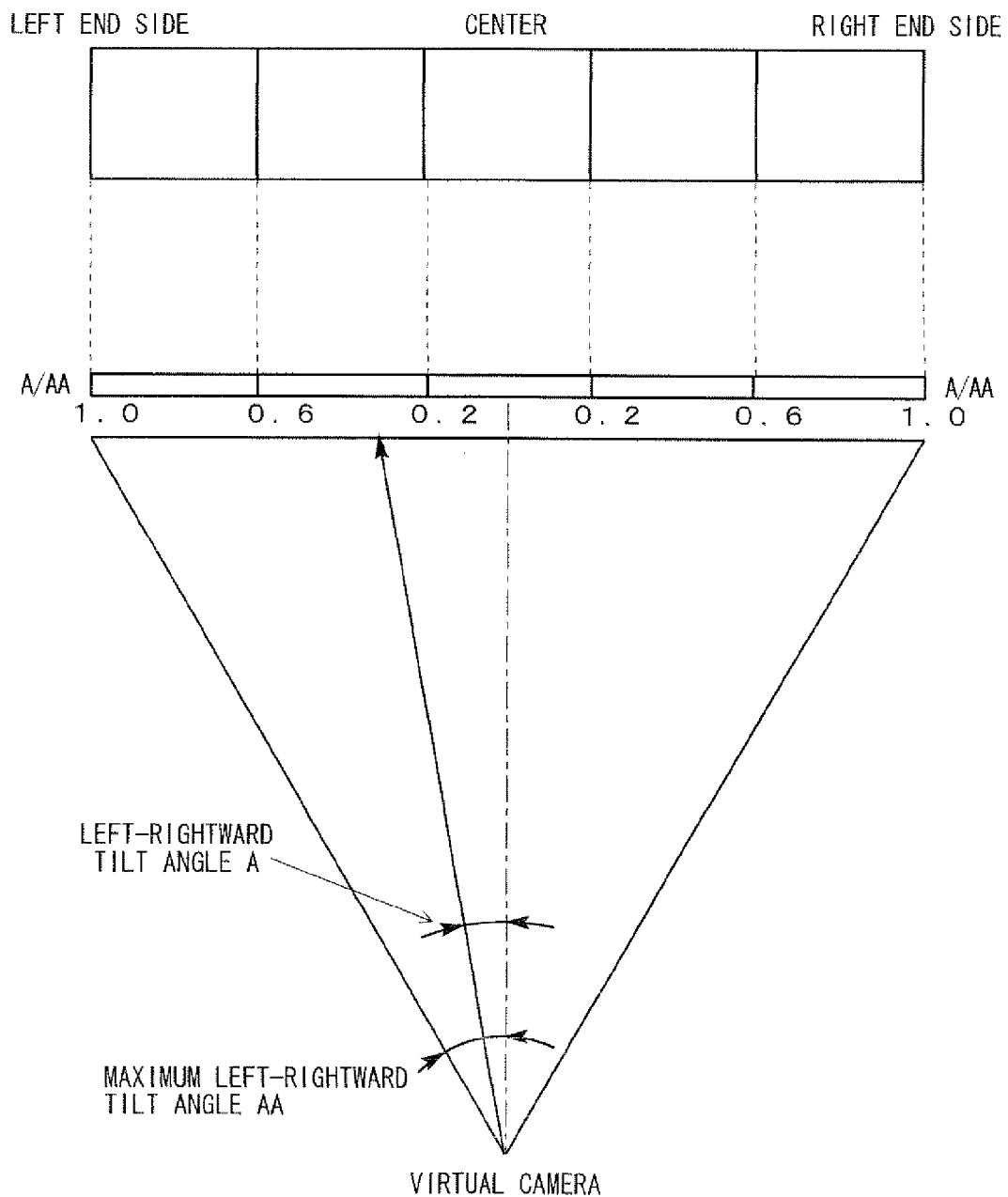
FIG. 16 is a conceptual diagram (part 2) illustrating a state in which a puzzle piece is selected when the game apparatus is tilted.

As shown in FIG. 16, when the puzzle pieces are horizontally aligned in 5 columns, the maximum left-rightward tilt angle AA is set to 30 degrees, and an angle satisfying the ratio C=0.2 and an angle satisfying the ratio C=0.6 are each set as a threshold value, for example. A case where a user tilts the game apparatus 10 in the up-downward direction can be described by rotating FIG. 16 by 90 degrees, and no description thereof is given. As shown in FIG. 16, since the maximum value of the ratio C is 1, the puzzle piece positioned at the center is selected when the game apparatus 10 is tilted at an angle ranging from 0 degree to 6 degrees (the threshold value 0.2), and the puzzle piece positioned in the column immediately outside the column aligned at the center is selected when the game apparatus 10 is tilted at an angle which is greater than 6 degrees but is not greater than 18 degrees (the threshold value 0.6), and the puzzle piece displayed at the endmost portion is selected when the game apparatus 10 is tilted at an angle greater than 18 degrees.

An interval between the threshold values may be increased toward the puzzle pieces positioned at the endmost portion. For example, an angle satisfying the ratio C=0.1 and an angle satisfying the ratio C=0.4 are each set as a threshold value. In this case, even when the game apparatus 10 is slightly tilted, the puzzle piece positioned closer to the endmost portion of the puzzle area is likely to be selected, and one puzzle piece can be always selected. Therefore, the operation for selecting a puzzle piece can be facilitated.

(Game Progress Operation)

Through the selection operation as described above, two puzzle pieces are selected by a user, and the selected puzzle pieces are switched, thereby progressing the game. The game progress operation will be described below with reference to FIG. 17 and FIG. 18. FIG. 17 shows images displayed from the start of the game to the first time puzzle piece switching. FIG. 18 shows images displayed from the final puzzle piece switching to the end of the game.

Figure 17A:
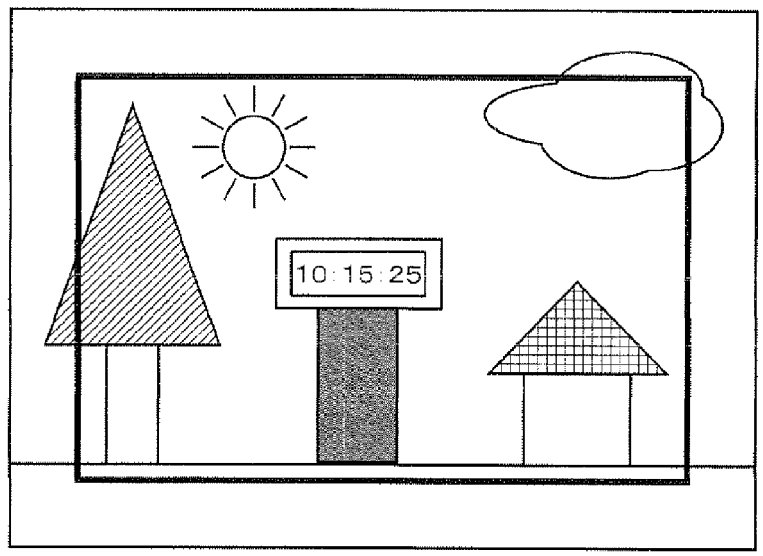
FIG. 17A is a diagram illustrating an exemplary image which is displayed on an upper LCD 22 when a predetermined area is set at the start of a game.
Figure 17B:
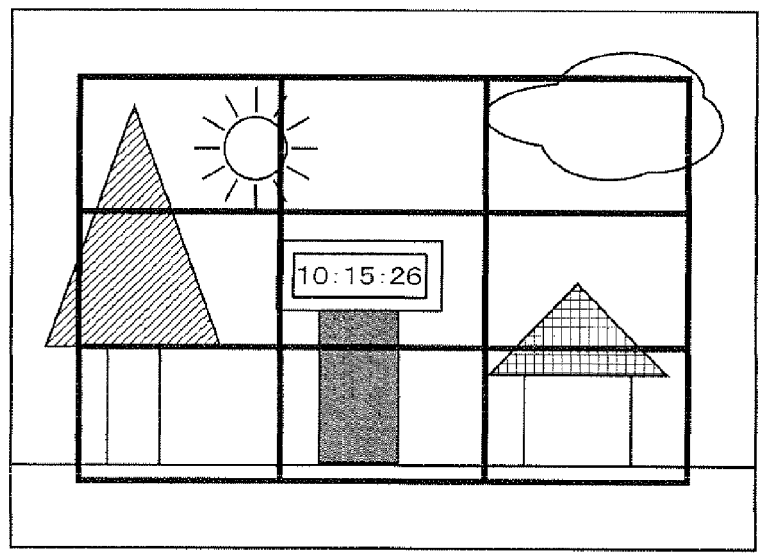
FIG. 17B is a diagram illustrating an exemplary image which is displayed on the upper LCD 22 when the area is divided into small areas.

As shown in FIG. 17A, in a state where an image of a range including a tree, a clock tower, the sun, a cloud, and a house is being taken by the outer imaging section 23, the game is started, and a puzzle area to be cut from the taken image is determined (step S10). The division number M for the puzzle area is set to 9 depending on the stage. At this time, as shown in FIG. 17B, the taken image is divided into 9 puzzle pieces. The image may not be necessarily displayed on the upper LCD 22 as shown in FIG. 17B. When the image is not displayed as in FIG. 17B, a state shown in FIG. 17A shifts to a state shown in FIG. 17C. At this time, the one-dimensional arrangement data represents "123456789".

Figure 17C:
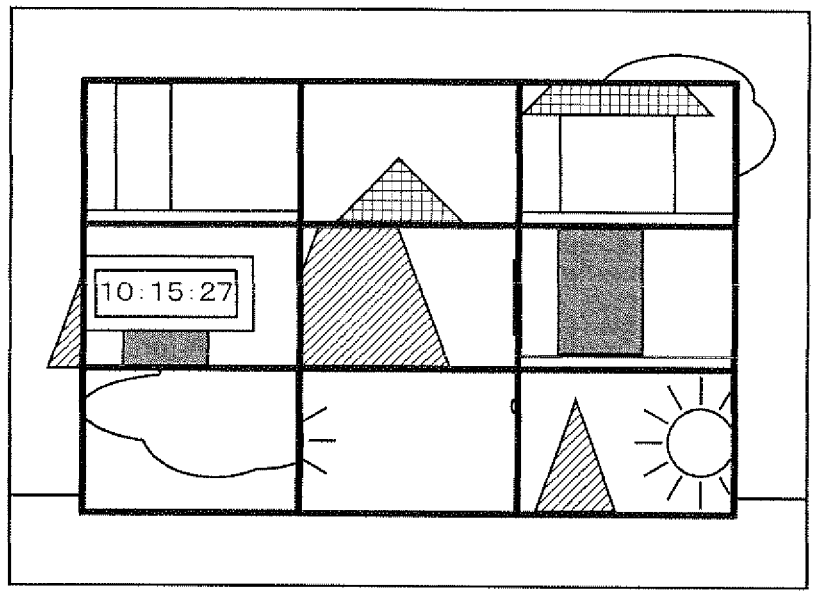
FIG. 17C is a diagram illustrating an exemplary image which is displayed on the upper LCD 22 when the small areas are positioned at random.

The one-dimensional arrangement data representing a state in which the puzzle pieces are positioned at random is generated (step S30). At this time, the one-dimensional arrangement data represents "769548321". The texture coordinate data which have been calculated are switched based on the one-dimensional arrangement data (step S705), to display an image on the upper LCD 22. An exemplary displayed image on the upper LCD 22 in this case is shown in FIG. 17C. Tilting of the game apparatus 10 is not changed (or the game apparatus 10 remains almost untilted) in states shown in FIG. 17A to FIG. 17C.

Figure 17D:
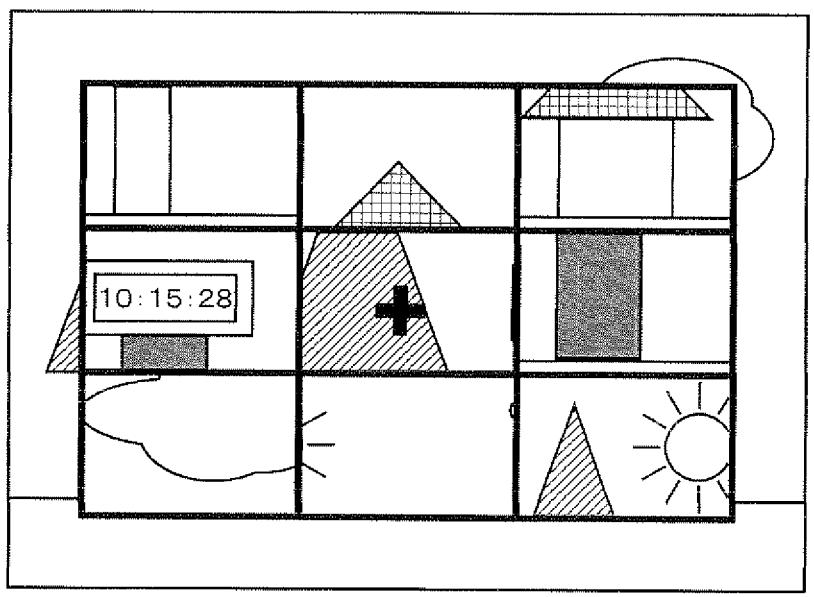
FIG. 17D is a diagram illustrating an exemplary image which is displayed on the upper LCD 22 when a fifth small area is a subject to be selected.
Figure 17E:
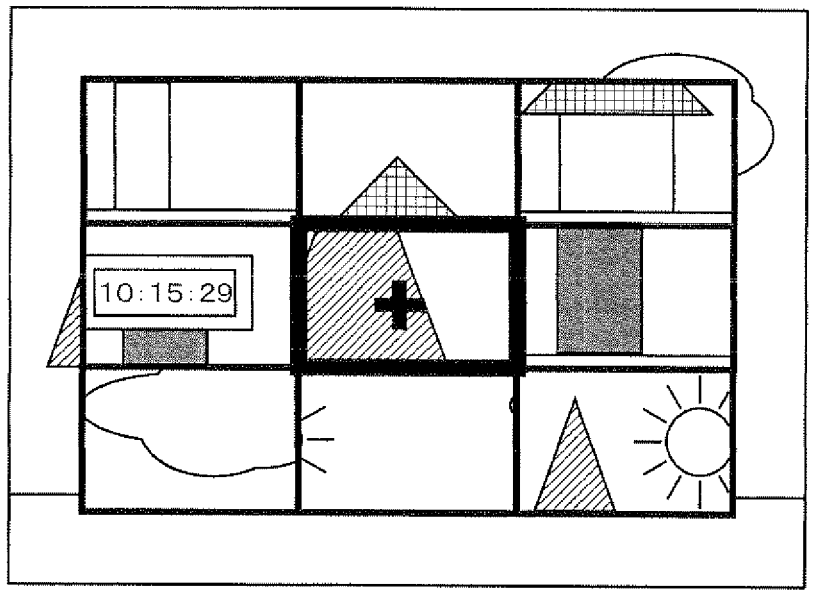
FIG. 17E is a diagram illustrating an exemplary image which is displayed on the upper LCD 22 when the fifth small area is confirmed to be selected.

When the puzzle game is started, a user intends to switch the puzzle piece positioned at the center (intermediate center position) (piece position "5") and the puzzle piece positioned at the intermediate left position (piece position "4"). When the two puzzle pieces are switched, the puzzle piece of the piece position "4" can be positioned at the proper position, and the puzzle piece of the piece position "5" can be positioned at the proper position. Therefore, the user firstly selects the puzzle piece of the piece position "5". As shown in FIG. 17D, unless the game apparatus 10 is tilted, the selection cursor is displayed so as to be put on the puzzle piece positioned at the intermediate center position (see FIG. 15(a) in which the different division number is used). The user presses the selection button in this state (YES in step S607). At this time, no selection-confirmed piece is retained (NO in step S608), and therefore the puzzle piece positioned at the intermediate center position is retained as the selection-confirmed piece. At this time, as shown in FIG. 17E, the puzzle piece is displayed such that the frame of the puzzle piece positioned at the intermediate center position is thickened, or the color of the frame thereof is changed, or the puzzle piece positioned at the intermediate center position is displayed as if the puzzle piece projects. (step S612).

Figure 17F:
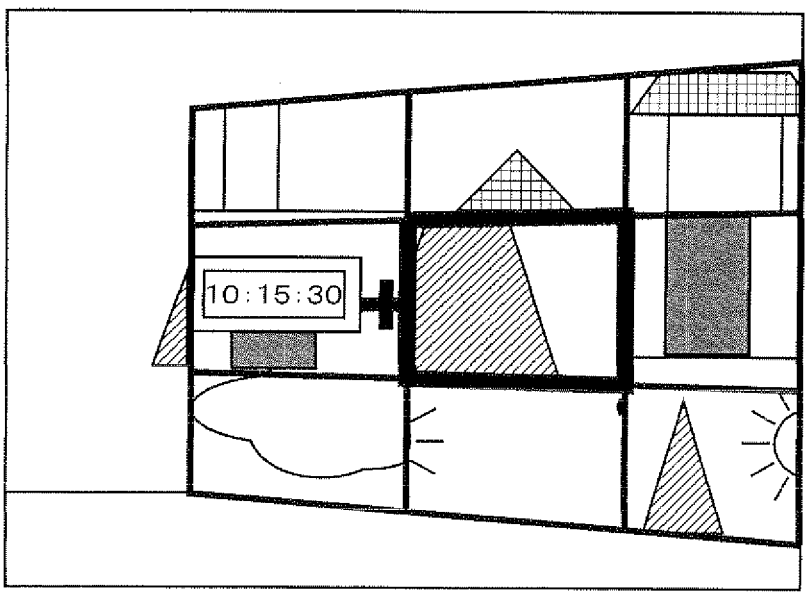
FIG. 17F is a diagram illustrating an exemplary image which is displayed on the upper LCD 22 when the game apparatus is tiled and a fourth small area is a subject to be selected.
Figure 17G:
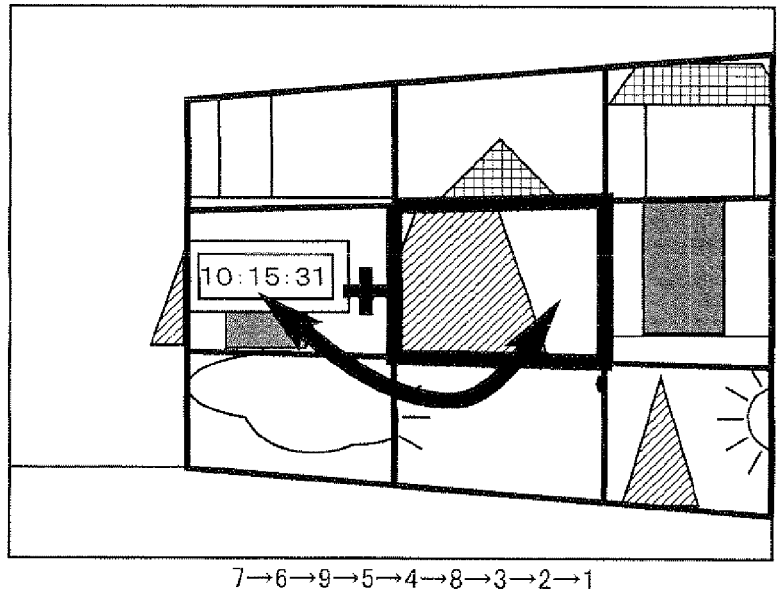
FIG. 17G is a diagram illustrating an exemplary image which is displayed on the upper LCD 22 when the fourth small area is confirmed to be switched in a state shown in FIG. 17F.

Next, the user selects the puzzle piece of the piece position "4". When the game apparatus 10 is tilted leftward in the state shown in FIG. 17E, the selection cursor is displayed so as to be put on the puzzle piece positioned at the intermediate left position in a state where the puzzle piece positioned at the intermediate center position is in the selection-confirmed state, as shown in FIG. 17F (see FIG. 15(b) in which the different division number is used). The user presses the selection button in this state (YES in step S607). At this time, since the selection-confirmed piece is retained (YES in step S608), the one-dimensional arrangement data is updated so as to display an image which is obtained when the puzzle piece positioned at the intermediate center position and the puzzle piece positioned at the intermediate left position are switched. At this time, as shown in FIG. 17G, the puzzle piece positioned at the intermediate center position and the puzzle piece positioned at the intermediate left position are switched (step S705).

Figure 17H:
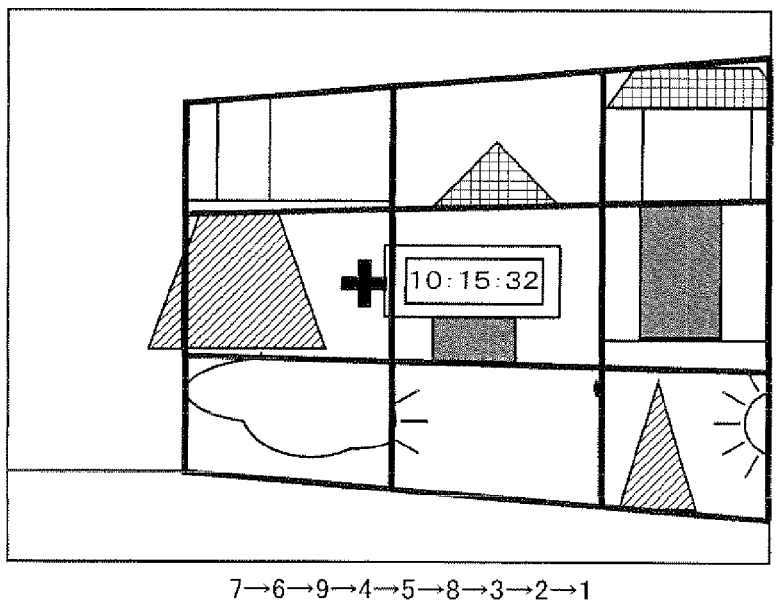
FIG. 17H is a diagram illustrating an exemplary image which is displayed on the upper LCD 22 when the fourth small area and the fifth small area have been switched in the state shown in FIG. 17F.

As a result, as shown in FIG. 17H, the puzzle piece of the piece position "4" and the puzzle piece of the piece position "5" are positioned at the proper positions. At this time, the one-dimensional arrangement data represents "769458321".

Figure 18A:
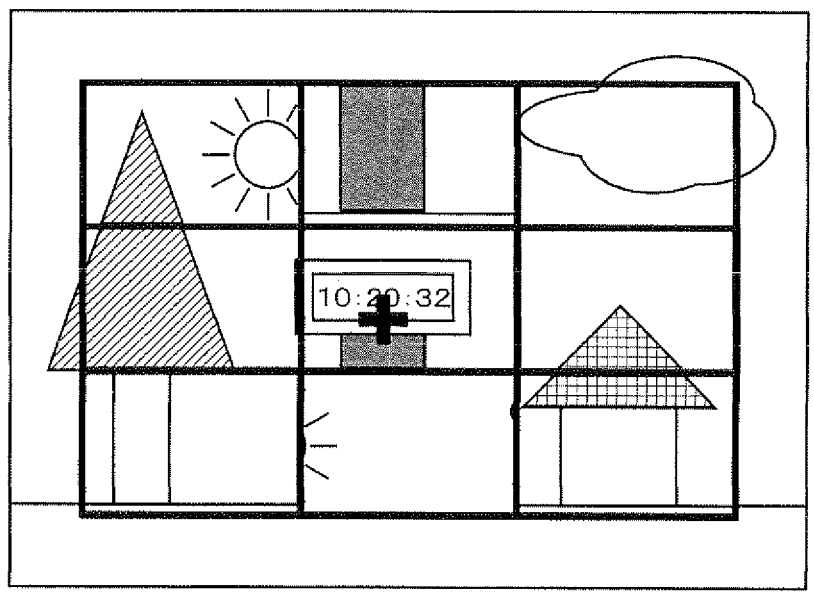
FIG. 18A is a diagram illustrating an exemplary image which is displayed on the upper LCD 22 when a game has progressed.

The game is progressed as describe above, and the state shown in FIG. 18A is obtained. In the state shown in FIG. 18A, when the puzzle piece (of the piece position "2") positioned at the upper center position and the puzzle piece (of the piece position "8") positioned at the lower center position are switched, the puzzle game will successfully resolve. That is, when these two puzzle pieces are switched, all the puzzle pieces can be positioned at the proper positions.

Figure 18B:
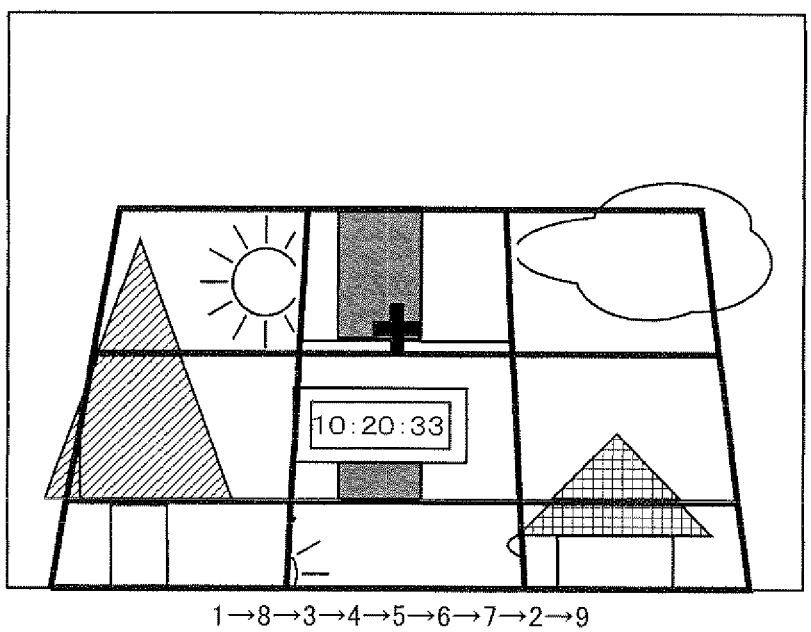
FIG. 18B is a diagram illustrating an exemplary image which is displayed on the upper LCD 22 when the game apparatus is tilted and a second small area is a subject to be selected.

Therefore, the user firstly selects the puzzle piece of the piece position "2". As shown in FIG. 18B, when the game apparatus 10 is tilted upward, the selection cursor is displayed so as to be put on the puzzle piece positioned at the upper center position. In this state, the user presses the selection button (YES in step S607). At this time, since no selection-confirmed piece is retained (NO in step S608), the puzzle piece positioned at the upper center position is retained as the selection-confirmed piece. At this time, as shown in FIG. 18C, the puzzle piece is displayed such that the frame of the puzzle piece positioned at the upper center position is thickened, or the color of the frame thereof is changed, or the puzzle piece positioned at the upper center position is displayed as if the puzzle piece projects (step S612).

Figure 18E:
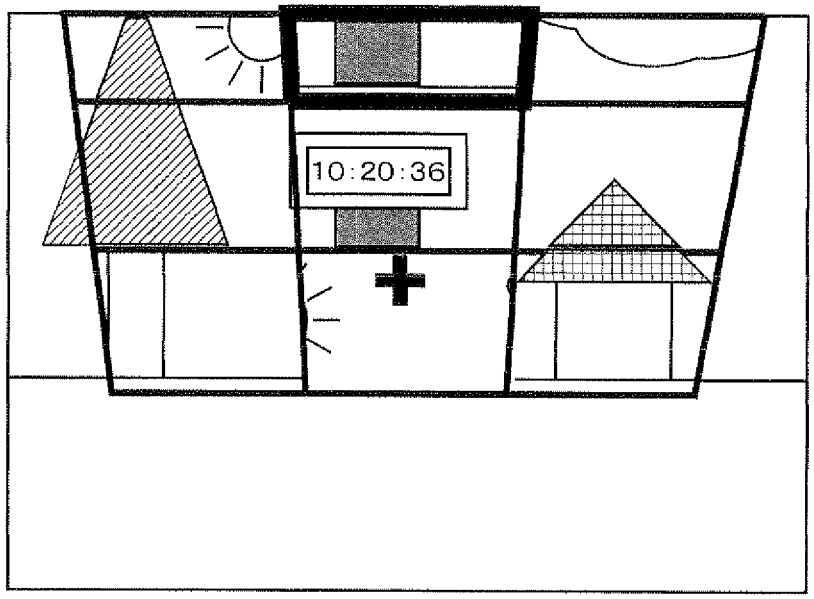
FIG. 18E is a diagram illustrating an exemplary image which is displayed on the upper LCD 22 when the game apparatus is tilted and an eighth small area is a subject to be selected.
Figure 18F:
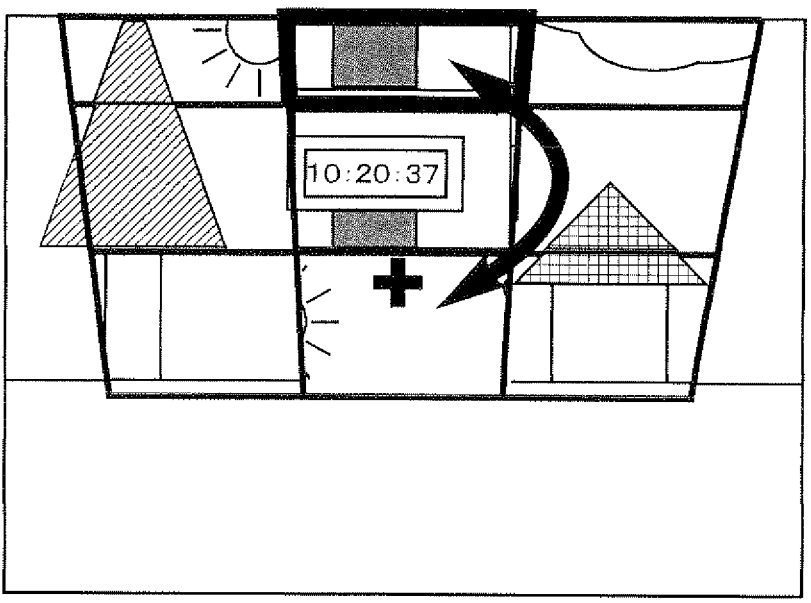
FIG. 18F is a diagram illustrating an exemplary image which is displayed on the upper LCD 22 when the eighth small area is confirmed to be exchanged in the state shown in FIG. 18E.

Next, the user selects the puzzle piece of the piece position "8". When the game apparatus 10 which is not tiled as in the state shown in FIG. 18D is tilted downward, the selection cursor is displayed so as to be put on the puzzle piece positioned at the lower center position as shown in FIG. 18E. In this state, the user presses the selection button (YES in step S607). At this time, since the selection-confirmed piece is retained (YES in step S608), the one-dimensional arrangement data is updated so as to display an image which is obtained when the puzzle piece positioned at the upper center position and the puzzle piece positioned at the lower center position are switched. At this time, as shown in FIG. 18F, the puzzle piece positioned at the upper center position and the puzzle piece positioned at the lower center position are switched (step S705).

Figure 18G:
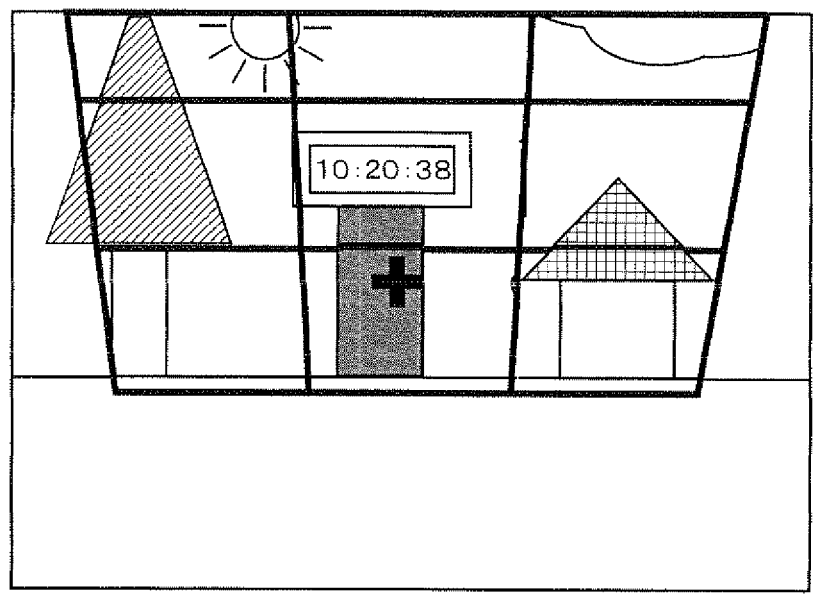
FIG. 18G is a diagram illustrating an exemplary image which is displayed on the upper LCD 22 when the second small area and the eighth small area are switched in the state shown in FIG. 18F.
Figure 18H:
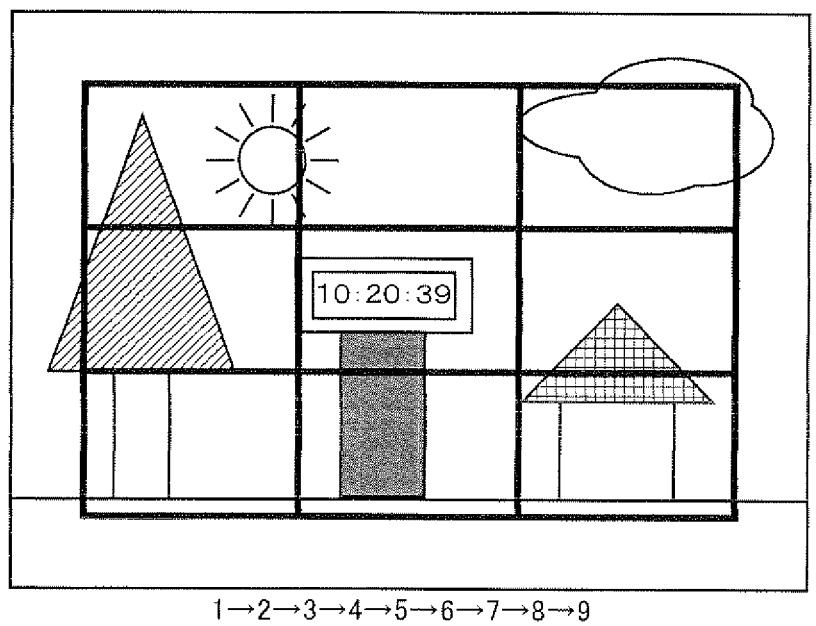
FIG. 18H is a diagram illustrating an exemplary image which is displayed on the upper LCD 22 when the game is ended.

As a result, as shown in FIG. 18G, the puzzle piece of the piece position "2" and the puzzle piece of the piece position "8" are positioned at the proper positions. At this time, the one-dimensional arrangement data represents "123456789". That is, it is determined that all the puzzle pieces are positioned at the proper positions (YES in step S610), and the stage is updated (step S611). FIG. 18H shows an exemplary displayed image on the upper LCD 22 in this state. FIG. 18H and FIG. 17B show the same image.

As described above, the game apparatus 10 according to the present embodiment can realize the puzzle game by using a landscape (background) of which the image is taken by the outer imaging section 23. In this case, when a user tilts the game apparatus 10 (in the left-rightward direction and/or the up-downward direction) in order to select a puzzle piece, the images displayed on the puzzle pieces are changed, and the cross-shaped cursor is moved, thereby selecting at least on puzzle piece. Therefore, it is possible to realize a puzzle game in which not a simple moving image but a moving image which is photographed at real time is used, and the puzzle piece can be selected by tilting the game apparatus 10.

(Modification)

In step S601 described above, the movement distance of the outer imaging section 23 is calculated based on a difference between the camera photographed data obtained in the most recent frame and the camera photographed data obtained in a frame immediately preceding the most recent frame, and the tilt angle is calculated based on the movement distance. However, the present invention is not limited thereto. For example, the tilt angle of the outer imaging section 23 may be directly calculated based on a difference between the camera photographed data obtained in the most recent frame and the camera photographed data obtained in a frame immediately preceding the most recent frame (without calculating the movement distance of the outer imaging section 23). Alternatively, the tilt angle of the outer imaging section 23 may be determined by using the acceleration data 74 which is a detection result obtained from the acceleration sensor 39 or by using the detection result obtained from a gyro sensor.

In step S605 described above, one puzzle piece is selected from among M puzzle pieces by using the ratio C and the ratio D. However, the present invention is not limited thereto. For example, a line of sight vector in a virtual space is calculated based on the tilt of the outer imaging section 23, and a puzzle piece having a point of intersection with the line of sight vector may be selected. Further, in this case, when no puzzle piece has a point of intersection with the line of sight vector, the puzzle piece closest to the line of sight vector may be selected. Further, in this case, it is preferable that the puzzle piece displayed at the end portion is more likely to be selected as compared to the puzzle piece displayed at the center portion of the upper LCD 22. At this time, the angle formed by the direction of the line of sight vector is changed so as to be twice the actual angle thereof, and the point of the intersection is calculated, thereby enabling the selection of the puzzle piece displayed at the end portion to be facilitated.

In step S703 described above, the texture coordinate data of the 9 puzzle pieces which are positioned at the proper positions, respectively, is calculated, and the texture coordinate data is switched based on the one-dimensional arrangement data, thereby displaying the puzzle pieces which are positioned at random. However, the present invention is not limited thereto. For example, the process for calculating the texture coordinate data and the process for switching the texture coordinate data may be performed in the reverse order.

In step S20 described above, the division number M (the number of puzzle pieces) for the puzzle area is set in accordance with the stage. For example, the division number M for the puzzle area may be set based on not the stage of the puzzle game but the difficulty level of the game.

When all the puzzle pieces cannot be positioned at the proper positions within a predetermined time period, the puzzle game may be ended.

Further, the present invention may be applied to any hand-held electronic devices (for example, a PDA (Personal Digital Assistant) or a mobile telephone), a personal computer, a camera, and the like as well as to the game apparatus of the present embodiment.

When the information processing section 31 of the game apparatus 10 according to the present embodiment executes a predetermined program, the process for the puzzle game as shown above in the flow chart is performed. However, the present invention is not limited thereto. A part or all of the process for the puzzle game may be performed by a dedicated circuit included in the game apparatus 10.

The process described above may be shared by a plurality of information processing apparatuses which are connected to each other so as to communicate with each other instead of the process described above being performed by one game apparatus (information processing apparatus).

While the example embodiments presented herein has been described in detail, the foregoing description is in all aspects illustrative and not restrictive. It is understood that numerous other modifications and variations can be devised without departing from the scope of the embodiments.

What is claimed is:

1. A non-transitory computer-readable storage medium having stored therein a game program executed by a computer of a hand-held game apparatus including an imaging device and a display device, the game program causing the computer to perform at least:
   sequentially acquiring taken-image data representing a plurality of taken-images which are taken by the imaging device;
   image dividing, into a plurality of small areas, an image of a predetermined area in a taken-image which is one of said plurality of taken-images represented by the acquired taken-image data;
   positioning, in the predetermined area, the plurality of small areas into which the image of the predetermined area is divided, so as to form an image different from the taken-image which is taken by the imaging device and is one of said plurality of taken-images;
   retaining a positioning state in which the plurality of small areas are positioned, by using, as an initial value, an obtained positioning state;
   image changing for sequentially changing, by using the taken-image data having been sequentially acquired, images to be displayed on the plurality of small areas, respectively, of which the positioning state is retained;
   display control for causing the display device to display images changed by the image changing;
   changing the positioning state of the plurality of small areas, which is retained, in accordance with an operation performed by a user viewing the images displayed by the display device;
   determining whether or not the positioning state of the plurality of small areas, which is changed, satisfies a predetermined condition; and
   a game process for performing a predetermined game process in accordance with a result of a determination of whether or not the positioning state of the plurality of small areas, which is changed, satisfies a predetermined condition.

2. The non-transitory computer-readable storage medium having stored therein the game program according to claim 1, wherein
   a game executed by the game program is a puzzle game, the game process performs a process for causing the puzzle game to successfully resolve when the positioning state in which a plurality of puzzle pieces corresponding to the plurality of small areas are positioned is returned to a state in which the plurality of puzzle pieces have not been positioned, and the retaining retains the positioning state of the plurality of puzzle pieces by retaining arrangement data representing the positioning state of the plurality of puzzle pieces, which is changed in accordance with the operation performed by a user, until the puzzle game successfully resolves.

3. The non-transitory computer-readable storage medium having stored therein the game program according to claim 2, wherein
   the arrangement data is one-dimensional arrangement data.

4. The non-transitory computer-readable storage medium having stored therein the game program according to claim 1, wherein
   the computer is caused to further perform detecting for a change in an imaging direction of the imaging device, and area change for changing a display state in which the predetermined area is displayed, based on the change in the imaging direction detected.

5. The non-transitory computer-readable storage medium having stored therein the game program according to claim 4, wherein
   the computer is caused to further perform predetermined area setting for setting the predetermined area such that the predetermined area is returned to a state in which the display state has not been changed by the area change, in accordance with an operation performed by a user.

6. The non-transitory computer-readable storage medium having stored therein the game program according to claim 4, wherein
   the area change changes the display state in which the predetermined area is displayed such that the predetermined area is moved in a direction opposite to a direction in which the imaging direction is changed.

7. The non-transitory computer-readable storage medium having stored therein the game program according to claim 4, wherein
   the area change changes the display state in which the predetermined area is displayed such that the predetermined area is enlarged in a direction opposite to a direction in which the imaging direction is changed.

8. The non-transitory computer-readable storage medium having stored therein the game program according to claim 4, wherein
   the image changing changes the images to be displayed on the plurality of small areas by pasting, as textures, images of the plurality of small areas in the taken-image represented by the taken-image data having been most recently acquired by the acquisition, to a plurality of polygons, in a virtual three-dimensional space, corresponding to the plurality of small areas, respectively, and by taking an image of the plurality of polygons by using a virtual camera, and the area change changes a range of the predetermined area of the taken-image by changing at least one of a position and an orientation of the virtual camera based on the change in the imaging direction detected by the detection.

9. The non-transitory computer-readable storage medium having stored therein the game program according to claim 1, wherein
   the image changing changes the images to be displayed on the plurality of small areas by pasting, as textures, images of the plurality of small areas in the taken-image represented by the taken-image data having been most recently acquired, to a plurality of polygons, in a virtual three-dimensional space, corresponding to the plurality of small areas, respectively, and by taking an image of the plurality of polygons by using a virtual camera.

10. The non-transitory computer-readable storage medium having stored therein the game program according to claim 4, wherein
   the computer is caused to further perform selecting one of the plurality of small areas displayed by the display device in accordance with the change in the imaging direction detected.

11. The non-transitory computer-readable storage medium having stored therein the game program according to claim 10, wherein
   the selection selects one of the plurality of small areas under a condition in which those of the plurality of small areas which are displayed near an end portion of the display device are more likely to be selected as compared to those of the plurality of small areas which are displayed near a center portion of the display device.

12. The non-transitory computer-readable storage medium having stored therein the game program according to claim 1, wherein
the computer is caused to further perform combined-image generation for combining the image, outside the predetermined area, which is sequentially acquired, with the images, in the predetermined area, which are changed by the image changing, to generate a combined image, the image division divides, into the plurality of small areas, the image in the predetermined area which is smaller than the taken-image, and the display control causes the display device to display the combined image which is obtained through combination performed by the combined-image generation.

13. The non-transitory computer-readable storage medium having stored therein the game program according to claim 1, wherein
the computer is caused to further perform number-of-plurality-of-small-areas setting for setting a number of the plurality of small areas in accordance with a skill of a user.

14. A hand-held game apparatus comprising:
an imaging unit for taking an image;
a display for displaying the taken-image;
an acquisition unit for sequentially acquiring taken-image data representing a plurality of taken-images which are taken by the imaging unit;
an image division unit for dividing, into a plurality of small areas, an image of a predetermined area in a taken-image which is one of said plurality of taken-images represented by the taken-image data acquired by the acquisition unit;
a positioning unit for positioning, in the predetermined area, the plurality of small areas into which the image of the predetermined area is divided by the image division unit, so as to form an image different from the taken-image which is taken by the imaging unit and is one of said plurality of taken-images;
a retaining unit for retaining a positioning state in which the plurality of small areas are positioned, by using, as an initial value, a positioning state obtained by the positioning unit;
an image changing unit for sequentially changing, by using the taken-image data having been sequentially acquired, images to be displayed on the plurality of small areas, respectively, of which the positioning state is retained by the retaining unit;
a display control unit for causing the display to display the images changed by the image changing unit;
a change unit for changing the positioning state of the plurality of small areas, which is retained by the retaining unit, in accordance with an operation performed by a user viewing the images displayed by the display;
a determination unit for determining whether or not the positioning state of the plurality of small areas, which is changed by the change unit, satisfies a predetermined condition; and
a game process unit for performing a predetermined game process in accordance with a result of a determination made by the determination unit.

15. A game system comprising:
an imaging unit for taking an image;
a display for displaying the taken-image;
an acquisition unit for sequentially acquiring taken-image data representing a plurality of taken-images which are taken by the imaging unit;
an image division unit for dividing, into a plurality of small areas, an image of a predetermined area in a taken-image which is one of said plurality of taken-images represented by the taken-image data acquired by the acquisition unit;
a positioning unit for positioning, in the predetermined area, the plurality of small areas into which the image of the predetermined area is divided by the image division unit, so as to form an image different from the taken-image which is taken by the imaging unit and is one of said plurality of taken-images;
a retaining unit for retaining a positioning state in which the plurality of small areas are positioned, by using, as an initial value, a positioning state obtained by the positioning unit;
an image changing unit for sequentially changing, by using the taken-image data having been sequentially acquired, images to be displayed on the plurality of small areas, respectively, of which the positioning state is retained by the retaining unit;
a display control unit for causing the display to display images changed by the image changing unit;
a change unit for changing the positioning state of the plurality of small areas, which is retained by the retaining unit, in accordance with an operation performed by a user viewing the images displayed by the display;
a determination unit for determining whether or not the positioning state of the plurality of small areas, which is changed by the change unit, satisfies a predetermined condition; and
a game process unit for performing a predetermined game process in accordance with a result of a determination made by the determination unit.

16. A computer-implemented game method comprising:
imaging for taking an image via an imaging device;
displaying the taken-image;
sequentially acquiring taken-image data representing a plurality of taken-images which are taken via said imaging device;
image division for dividing, via one or more computer processing devices, into a plurality of small areas, an image of a predetermined area in a taken-image which is one of said plurality of taken-images represented by the acquired taken-image data;
positioning, in the predetermined area, the plurality of small areas into which the image of the predetermined area is divided by the image division, so as to form an image different from the taken-image and is one of said plurality of taken-images;
retaining a positioning state in which the plurality of small areas are positioned, by using, as an initial value, an obtained positioning state;
image changing for sequentially changing, by using the taken-image data having been sequentially acquired, images to be displayed on the plurality of small areas, respectively, of which the positioning state is retained;
display control for controlling the display step to display the sequentially changed images;
change for changing, via one or more computer processing devices, the positioning state of the plurality of small areas, which is retained, in accordance with an operation performed by a user viewing the images displayed;
determining whether or not the positioning state of the plurality of small areas, which is changed, satisfies a predetermined condition; and
a game process for performing a predetermined game process, via one or more computer processing devices, in accordance with a result of a determination of whether or not the positioning state of the plurality of small areas, which is changed, satisfies a predetermined condition.

\* \* \* \* \*